United States Patent
Ohnishi et al.

(10) Patent No.: US 10,556,448 B2
(45) Date of Patent: Feb. 11, 2020

(54) INK JET PRINTING APPARATUS AND INK JET PRINTING METHOD

(71) Applicant: CANON KABUSHIKI KAISHA, Tokyo (JP)

(72) Inventors: Toru Ohnishi, Yokohama (JP); Toru Yamane, Yokohama (JP); Kyosuke Deguchi, Yokohama (JP); Ryosuke Hirokawa, Kawasaki (JP); Akihiro Mouri, Fuchu (JP); Noboru Toyama, Kawasaki (JP); Atsushi Sakamoto, Yokohama (JP); Susumu Hirosawa, Tokyo (JP); Toshimori Miyakoshi, Yokohama (JP); Hiroaki Motooka, Kawasaki (JP); Ryohei Goto, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/026,194

(22) Filed: Jul. 3, 2018

(65) Prior Publication Data

US 2018/0326755 A1 Nov. 15, 2018

Related U.S. Application Data

(63) Continuation of application No. PCT/JP2016/005244, filed on Dec. 28, 2016.

(30) Foreign Application Priority Data

Jan. 5, 2016 (JP) .................................. 2016-000747
Jan. 29, 2016 (JP) .................................. 2016-016659
(Continued)

(51) Int. Cl.
*B41J 2/01* (2006.01)
*B41J 11/00* (2006.01)
*B41J 2/045* (2006.01)

(52) U.S. Cl.
CPC ....... *B41J 11/0015* (2013.01); *B41J 2/04563* (2013.01); *B41J 2/04566* (2013.01); *B41J 2/04586* (2013.01)

(58) Field of Classification Search
USPC .......................................................... 347/103
See application file for complete search history.

(56) References Cited

U.S. PATENT DOCUMENTS 3,962,153 A 6/1976 Gore
5,841,456 A 11/1998 Takei et al.
(Continued)

FOREIGN PATENT DOCUMENTS

CN 1990241 A 7/2007
CN 101332708 A 12/2008
(Continued)

OTHER PUBLICATIONS

Chinese Office Action, dated Apr. 25, 2019, issued in Chinese Patent Application No. 201680078100.3.
(Continued)

*Primary Examiner* — Lam S Nguyen
(74) *Attorney, Agent, or Firm* — Venable LLP

(57) ABSTRACT

When a porous body is repeatedly used to perform treatment of absorbing and removing an aqueous liquid component on an image which is formed using a reaction liquid and an ink and contains the aqueous liquid component and a coloring material, recovery treatment for applying a recovery liquid to the porous body is performed, the recovery liquid having a viscosity lower than a viscosity of the reaction liquid and the ink.

38 Claims, 7 Drawing Sheets

(30) Foreign Application Priority Data

May 30, 2016 (JP) ................................ 2016-107949
May 30, 2016 (JP) ................................ 2016-107960

(56) References Cited

U.S. PATENT DOCUMENTS

| | | | |
|---|---|---|---|
| 6,916,081 | B2 | 7/2005 | Nakashima |
| 7,129,284 | B2 | 10/2006 | Ma et al. |
| 7,422,318 | B2 | 9/2008 | Kadomatsu et al. |
| 7,481,526 | B2 | 1/2009 | Inoue |
| 7,494,213 | B2 | 2/2009 | Taniuchi et al. |
| 7,497,564 | B2 | 3/2009 | Yui |
| 7,556,342 | B2 | 7/2009 | Hamano |
| 7,594,722 | B2 | 9/2009 | Kadomatsu et al. |
| 7,740,350 | B2 * | 6/2010 | Kessler ............... B41J 2/0057 347/103 |
| 7,766,457 | B2 | 8/2010 | Chen |
| 7,845,760 | B2 | 12/2010 | Hirakawa |
| 7,926,933 | B2 | 4/2011 | Taniuchi et al. |
| 7,997,717 | B2 | 8/2011 | Taniuchi et al. |
| 8,226,225 | B2 | 7/2012 | Yamanobe |
| 8,246,158 | B2 | 8/2012 | Ageishi et al. |
| 8,857,962 | B2 | 10/2014 | Goto et al. |
| 9,102,137 | B2 | 8/2015 | Koitabashi et al. |
| 9,616,653 | B2 | 4/2017 | Liu |
| 9,769,171 | B2 | 9/2017 | Gomi |
| 9,821,584 | B2 | 11/2017 | Noguchi et al. |
| 10,137,690 | B2 | 11/2018 | Hirokawa et al. |
| 2006/0055755 | A1 | 3/2006 | Yui |
| 2006/0061642 | A1 | 3/2006 | Ueki |
| 2006/0170752 | A1 | 8/2006 | Kadomatsu et al. |
| 2006/0221166 | A1 | 10/2006 | Inoue |
| 2007/0229586 | A1 | 10/2007 | Hirakawa |
| 2008/0055356 | A1 | 3/2008 | Yamanobe |
| 2008/0236480 | A1 | 10/2008 | Furukawa et al. |
| 2009/0079784 | A1 | 3/2009 | Chiwata et al. |
| 2011/0018925 | A1 * | 1/2011 | Ohara ................... B41J 2/0057 347/16 |
| 2011/0069109 | A1 | 3/2011 | Tojo |
| 2015/0306539 | A1 | 10/2015 | Yamato |
| 2016/0185110 | A1 | 6/2016 | Masuda et al. |
| 2018/0311951 | A1 | 11/2018 | Sakamoto et al. |
| 2018/0319179 | A1 | 11/2018 | Yamane et al. |
| 2018/0326719 | A1 | 11/2018 | Masuda et al. |
| 2018/0345702 | A1 | 12/2018 | Deguchi et al. |
| 2019/0009550 | A1 | 1/2019 | Inoue et al. |
| 2019/0009578 | A1 | 1/2019 | Takeuchi et al. |
| 2019/0009579 | A1 | 1/2019 | Inoue et al. |

FOREIGN PATENT DOCUMENTS

| | | |
|---|---|---|
| CN | 100546832 C | 10/2009 |
| CN | 101607468 A | 12/2009 |
| CN | 103660656 A | 3/2014 |
| CN | 105593020 A | 5/2016 |
| EP | 2 123 459 A2 | 11/2009 |
| EP | 2 777 941 A1 | 9/2014 |
| JP | 56-45773 B2 | 10/1981 |
| JP | 2000-103157 A | 4/2000 |
| JP | 2001-171143 A | 6/2001 |
| JP | 2001-179959 A | 7/2001 |
| JP | 2004-043047 A | 2/2004 |
| JP | 2004-181955 A | 7/2004 |
| JP | 2006-082428 A | 3/2006 |
| JP | 2006-088486 A | 4/2006 |
| JP | 2006-102981 A | 4/2006 |
| JP | 2006-205677 A | 8/2006 |
| JP | 2006-264080 A | 10/2006 |
| JP | 2007-268974 A | 10/2007 |
| JP | 2007-268975 A | 10/2007 |
| JP | 4016559 B2 | 12/2007 |
| JP | 2008-055852 A | 3/2008 |
| JP | 2008-213333 A | 9/2008 |
| JP | 2008-246787 A | 10/2008 |
| JP | 2009-000915 A | 1/2009 |
| JP | 2009-000916 A | 1/2009 |
| JP | 2009-045851 A | 3/2009 |
| JP | 2009-061644 A | 3/2009 |
| JP | 2008-087283 A | 4/2009 |
| JP | 2009-072927 A | 4/2009 |
| JP | 2009-086348 A | 4/2009 |
| JP | 2009-159116 A | 7/2009 |
| JP | 2009-166387 A | 7/2009 |
| JP | 2009-214439 A | 9/2009 |
| JP | 2009-226852 A | 10/2009 |
| JP | 2009-234219 A | 10/2009 |
| JP | 2010-201796 A | 9/2010 |
| JP | 2011-063001 A | 3/2011 |
| JP | 2011-245865 A | 12/2011 |
| JP | 2012-116617 A | 6/2012 |
| JP | 2012-183798 A | 9/2012 |
| JP | 2013-010267 A | 1/2013 |
| JP | 2014-193599 A | 10/2014 |
| JP | 2015-016687 A | 1/2015 |
| JP | 2015-096562 A | 5/2015 |
| JP | 2015-098097 A | 5/2015 |
| JP | 2015-145117 A | 8/2015 |
| JP | 2015-150789 A | 8/2015 |
| JP | 2015-208881 A | 11/2015 |
| JP | 2016-120625 A | 7/2016 |
| WO | 2015034027 A1 | 3/2015 |
| WO | 2018105215 A1 | 6/2018 |

OTHER PUBLICATIONS

Chinese Office Action, dated Apr. 25, 2019, issued in Chinese Patent Application No. 201680078027.X.
Chinese Office Action, dated Apr. 28, 2019, issued in Chinese Patent Application No. 201680078028.4.
Chinese Office Action, dated May 24, 2019, issued in Chinese Patent Application No. 201680078084.8.
Extended European Search Report, dated Jul. 11, 2019, issued in European Patent Application No. 16883554.4.
Extended European Search Report, dated Jul. 11, 2019, issued in European Patent Application No. 16883553.6.
Extended European Search Report, dated Jul. 12, 2019, issued in European Patent Application No. 16883551.0.
Extended European Search Report, dated Jul. 12, 2019, issued in European Patent Application No. 16883550.2.
Extended European Search Report, dated Jul. 23, 2019, issued in European Patent Application No. 16883549.4.
International Search Report, dated Mar. 7, 2017, issued in International Patent Application No. PCT/JP2016/005241.
International Search Report, dated Mar. 28, 2017, issued in International Patent Application No. PCT/JP2016/005248.
International Search Report, dated Mar. 28, 2017, issued in International Patent Application No. PCT/JP2016/005246.
International Search Report, dated Mar. 7, 2017, issued in International Patent Application No. PCT/JP2016/005242.
International Search Report, dated Mar. 21, 2017, issued in International Patent Application No. PCT/JP2016/005247.
International Search Report, dated Mar. 7, 2017, issued in International Patent Application No. PCT/JP2016/005249.
International Search Report, dated Apr. 4, 2017, issued in International Patent Application No. PCT/JP2016/005251.
International Search Report, dated Mar. 14, 2017, issued in International Patent Application No. PCT/JP2016/005250.
International Search Report, dated Apr. 4, 2017, issued in International Patent Application No. PCT/JP2017/002666.
Singapore Search Report and Written Opinion dated Sep. 17, 2018, in SG Patent Application No. 11201805829P.
International Preliminary Report on Patentability dated Jul. 19, 2018, in International Application No. PCT/JP2016/005244.
International Search Report and Written Opinion dated Mar. 28, 2017, in International Application No. PCT/JP2016/005244.

* cited by examiner

INK JET PRINTING APPARATUS AND INK JET PRINTING METHOD

CROSS-REFERENCE TO RELATED APPLICATIONS

This application is a Continuation of International Patent Application No. PCT/JP2016/005244, filed Dec. 28, 2016, which claims the benefit of Japanese Patent Application Nos. 2016-000747, filed Jan. 5, 2016, 2016-016659, filed Jan. 29, 2016, 2016-107960, filed May 30, 2016, and 2016-107949 filed May 30, 2016, all of which are hereby incorporated by reference herein in their entirety.

BACKGROUND OF THE INVENTION

Field of the Invention

The present invention relates to an ink jet printing apparatus and an ink jet printing method.

Description of the Related Art

In the ink jet printing method, an image is formed by directly or indirectly applying a liquid composition (ink) containing a coloring material to a printing medium such as paper. In this process, the printing medium may cause curl or cockling due to excessive absorption of a liquid component in the ink.

Thus, to quickly remove the liquid component in the ink, there are a method of drying the printing medium using a means such as warm air or infrared light and a method in which an image is formed on a transfer body, subsequently, a liquid component contained in the image on the transfer body is dried by thermal energy or the like, and then the image is transferred onto a printing medium such as paper.

In addition, as a means to remove the liquid component contained in an image on the transfer body, there has been proposed a method including, instead of using thermal energy, bringing a roller-shaped porous body into contact with an ink image and absorbing and removing the liquid component from the ink image (Japanese Patent Application Laid-Open No. 2009-45851).

Furthermore, a configuration has been proposed which removes liquid from an ink image by using a porous body as an absorber, and thereafter performs a step of absorbing and collecting liquid from the porous body by a pump or the like, the step including applying another liquid the absorber before the collection of the liquid, thereby preventing the air from being suctioned unnecessarily (Japanese Patent Application Laid-Open No. 2007-268975).

As disclosed in Japanese Patent Application Laid-Open No. 2009-45851, when a porous body included in a liquid absorbing member is repeatedly used for removal of the liquid from ink images, the liquid absorbed inside the porous body may increase in viscosity. In particular, in the case of facilitating fixing of an ink image by using reaction liquid for increasing ink viscosity, increase in the viscosity of the liquid absorbed inside the porous body may become significant. When such increase in the viscosity occurs, the flow resistance in the porous body during removal of liquid increases, and the porous body may fail to absorb the liquid to a required and sufficient degree while being in contact with the ink image. This failure was found to consequently cause a phenomenon (hereinafter referred to as "smeared image") in which the liquid content in the ink image is pushed to flow toward the trailing end of the ink image by a pressure of a liquid absorbing member. Although Japanese Patent Application Laid-Open No. 2007-268975 discloses that applying the liquid for preventing the air from being suctioned unnecessarily improves an efficiency of collection of the liquid from a porous body, but provides no description or suggestion regarding the possibility that the porous body has the above-mentioned problem due to an increased viscosity of the liquid content inside the porous body.

The present invention has been made in consideration of such background art. It is an object of the present invention to provide an ink jet printing apparatus and an ink jet printing method that are capable of inhibiting smeared image and forming a high-definition image even when a porous body is repeatedly used for absorbing liquid content from an image formed.

SUMMARY OF THE INVENTION

An ink jet printing apparatus according to the present invention includes:

an image forming unit that applies an ink containing an aqueous liquid medium and a coloring material as well as a reaction liquid for increasing ink viscosity to an ink receiving medium, and thereby forms a first image containing an aqueous liquid component and the coloring material; and a liquid absorbing member including a porous body that absorbs at least part of the aqueous liquid component from the first image, wherein the ink jet printing apparatus further comprises:

a conveyance unit that performs carrying-in, carrying-out, and re-transmission of the liquid absorbing member to and from a liquid absorption treatment region in which the liquid absorbing member performs liquid absorption treatment on the first image; and a recovery liquid applying unit that applies a recovery liquid to the liquid absorbing member carried out from the liquid absorption treatment region, the recovery liquid having a viscosity lower than a viscosity of the ink and the reaction liquid.

In addition, an ink jet printing method according to the present invention includes:

an image forming step of applying an ink containing an aqueous liquid medium and a coloring material as well as a reaction liquid for increasing ink viscosity to an ink receiving medium, and thereby forming a first image containing an aqueous liquid component and the coloring material; and a liquid absorbing step of performing liquid absorption treatment in the liquid absorption treatment region, the liquid absorption treatment including bringing a first surface of a porous body included in a liquid absorbing member into contact with the first image and absorbing at least part of the aqueous liquid component from the first image by the porous body, wherein the ink jet printing method further comprises:

a conveyance step of re-transmitting a porous body carried out from the liquid absorption treatment region to the liquid absorption region; and a recovery liquid applying step of causing a recovery liquid applying unit to apply recovery liquid to the first surface of the porous body before being re-transmitted, the recovery liquid having a viscosity lower than a viscosity of the ink and the reaction liquid.

Further features of the present invention will become apparent from the following description of exemplary embodiments with reference to the attached drawings.

DESCRIPTION OF THE EMBODIMENTS

Figure 1:
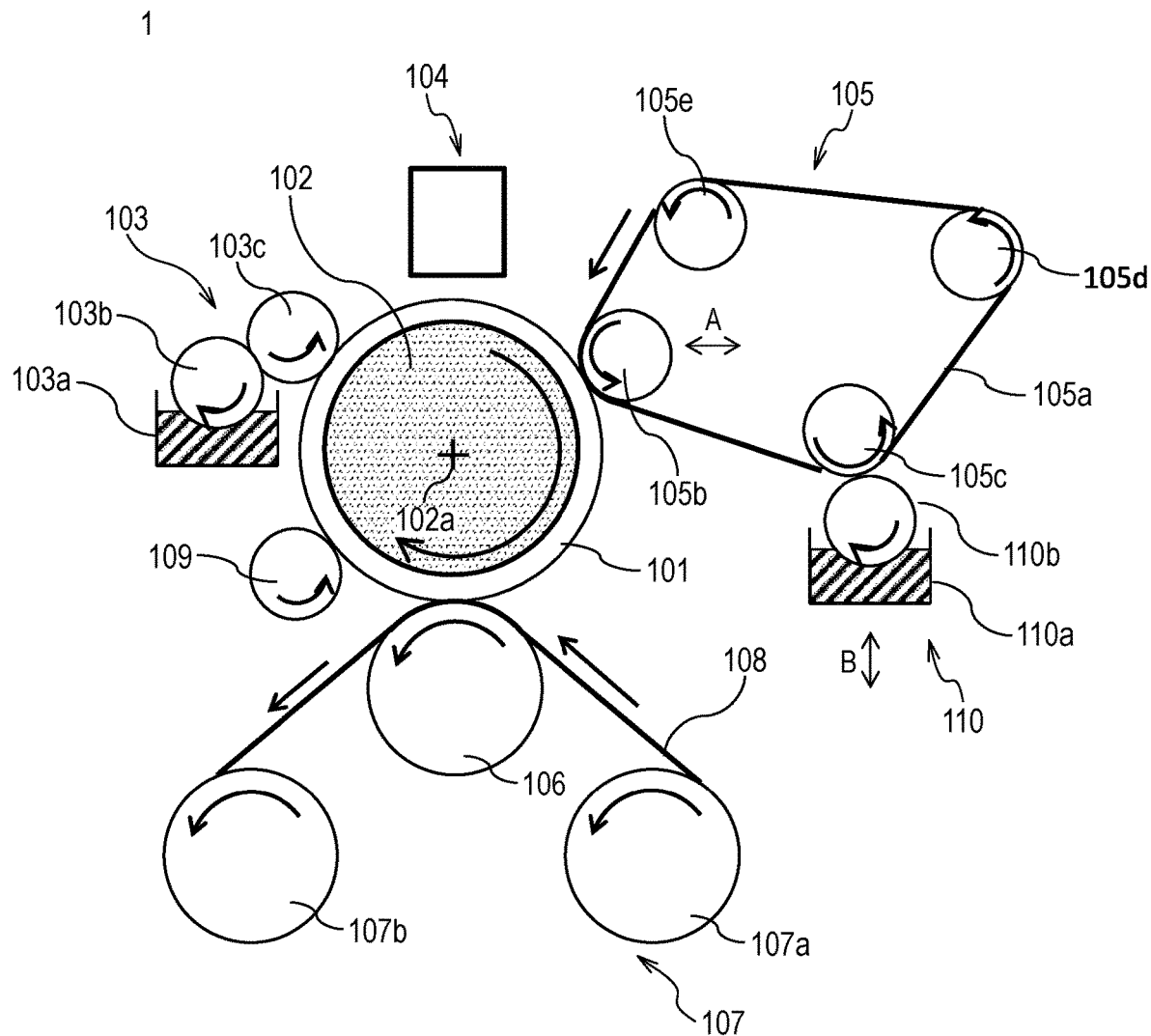
FIG. 1 is a schematic view illustrating an example of a configuration of a transfer type ink jet printing apparatus 1 in the present invention.

Preferred embodiments of the present invention will now be described in detail in accordance with the accompanying drawings.

An ink jet printing method according to the present embodiment has: an image forming step of applying an ink containing an aqueous liquid medium and a coloring material as well as a reaction liquid for increasing ink viscosity for promoting coloring material fixation to an ink receiving medium, and thereby forming a first image containing an aqueous liquid component and the coloring material; and a liquid absorbing step of performing liquid absorption treatment for absorbing at least part of the aqueous liquid component from the first image by a liquid absorbing member. The application of the coloring material to the ink receiving medium is performed by the ink jet method.

The liquid absorbing member has a porous body having absorbability of an aqueous liquid component, and the porous body has a first surface as a contact surface to be in contact with the first image. At least part of the aqueous liquid component contained in the first image is absorbed by the porous body via the first surface of the porous body.

The liquid absorption treatment is performed in a liquid absorption treatment region where the porous body included in the liquid absorbing member is allowed to come into contact with the first image.

An ink jet printing method according to the present embodiment has: a conveyance step of re-transmitting a porous body carried out from the liquid absorption treatment region to the liquid absorption region; and a recovery liquid applying step of causing a recovery liquid applying unit to apply recovery liquid to the first surface of the porous body before being re-transmitted, the recovery liquid having a viscosity lower than a viscosity of the reaction liquid.

An ink jet printing apparatus used by the ink jet printing method according to the present embodiment has: an image forming unit that forms a first image containing an aqueous liquid component and a coloring material; and a liquid absorbing member including a porous body that absorbs at least part of the aqueous liquid component from the first image The image forming unit has: a reaction liquid applying unit that applies reaction liquid for increasing ink viscosity for promoting coloring material fixation; and an ink jet printing unit that applies an ink containing the aqueous liquid component and the coloring material The liquid absorption treatment by the liquid absorbing member for the first image is performed in the liquid absorption treatment region, and the liquid absorbing member and the first image are disposed to allow contact therebetween in the liquid absorption treatment region. Carrying-in, carrying-out, and re-transmission of the liquid absorbing member is performed by the conveyance unit on the liquid absorption treatment region, and a recovery liquid application unit is further provided, which applies recovery liquid to the porous body included in the liquid absorbing member before being re-transmitted.

The ink jet printing method according to the present embodiment further includes a wetting liquid applying step of applying wetting liquid having an angle of contact less than 90° with the first surface of the porous body to the first surface of the porous body, and may further include a liquid absorbing step of performing liquid absorption treatment via the first surface, to which wetting liquid has been applied, of the porous body. Wetting treatment for the first surface of the porous body can be performed by at least one of the following methods:

(1) A method of performing wetting treatment by storing wetting liquid in a container and supplying and applying the wetting liquid from the container to the first surface of the porous body.

(2) A method of performing wetting treatment by providing the function as the wetting liquid to the aqueous liquid component contained in an image to be processed, and bringing the first surface of the porous body into contact with the first image.

The recovery liquid applying step also serves as the wetting liquid applying step, in other words, these steps can be the same step In addition to the previously stated configuration, an ink jet printing apparatus applicable to the ink jet printing method using wetting liquid according to the present embodiment has a wetting treatment unit that performs wetting treatment by applying wetting liquid having an angle of contact less than 90° with the first surface of the porous body to the first surface of the porous body As the configuration of the wetting treatment unit, at least one of the following configurations may be used.

(A) The configuration including a container that stores wetting liquid and a wetting liquid application unit that supplies and applies the wetting liquid from the container to the first surface of the porous body.

(B) The configuration in which the function as the wetting liquid is provided to the aqueous liquid component contained in the first image, and the region, in which the first image is formed, of the ink receiving medium also serves as the wetting treatment unit so that wetting treatment is performed by a first liquid for the first surface of the porous body in contact with the first image.

According to the present invention, the porous body of the liquid absorbing member is brought into contact with the first image containing an aqueous liquid component and a coloring material on an ink receiving medium, thereby removing at least part of the aqueous liquid component from the first image. As a consequence, a printing medium such as paper is inhibited from causing curl or cockling due to excessive absorption of the aqueous liquid component in the first image.

In addition, even when a porous body is repeatedly utilized for treatment of liquid content absorption from the first image formed using reaction liquid and an ink, it is possible to reduce the increase in the viscosity of the liquid absorbed in the porous body by applying reaction liquid having a viscosity lower than the viscosity of the ink and the reaction liquid to the porous body before being re-used. As a consequence, it is possible to prevent smeared image and to form a high-definition image.

In the ink jet printing apparatus according to the present embodiment, the image forming unit is not particularly limited as long as the image forming unit can form the first image containing an aqueous liquid component and a coloring material on an ink receiving medium. It is to be noted that the first image refers to an ink image prior liquid removal before liquid absorption treatment is performed by a liquid absorbing member. Also, post-liquid removal ink image which has undergone liquid absorption treatment and has a reduced content of a first liquid is also referred to as a second image.

The image forming unit preferably has 1) an apparatus including a reaction liquid applying unit that applies reaction liquid onto an ink receiving medium, and 2) an apparatus including an ink jet printing unit that applies an ink containing an aqueous liquid medium and a coloring material onto an ink receiving medium.

The first image as a target for liquid absorption treatment is formed by applying reaction liquid and ink to an ink receiving medium so that the reaction liquid and ink have a region in which are overlapped. The fixation of a coloring material applied onto an ink receiving medium along with the ink by the reaction liquid is promoted and improved. The promotion and improvement of the fixation of a coloring material refer to a fixed state in which the fluidity of the ink itself or the coloring material in the ink is reduced by the effect of the reaction liquid since an initial state in which the ink applied to the ink receiving medium has fluidity, and the viscosity is increased and the ink is unlikely to flow as compared with the initial state. The mechanism will be described later.

The first image is formed including a mixture of the reaction liquid and the ink. The ink contains an aqueous liquid medium containing water, and the reaction liquid also contains an aqueous liquid medium containing water as necessary. The first image contains an aqueous liquid component containing water supplied from these aqueous liquid media along with the coloring material.

An ink jet printing device is used as the device that applies an ink onto an ink receiving medium Also, the reaction liquid may contain a component that chemically or physically reacts with the ink, and viscously thickens a mixture of the reaction liquid and the ink at a level higher than the thickens of each of the reaction liquid and the ink, and improves the fixation of the coloring material. The reaction liquid may contain an aqueous liquid medium. The aqueous liquid medium contains at least water, and a water-soluble organic solvent and various additive agents as necessary.

When water is first liquid, at least one of the reaction liquid and the ink may contain second liquid other than the first liquid. Although the second liquid may have a high or low volatility, the second liquid preferably has a volatility higher than the volatility of the first liquid.

Hereinafter, an embodiment of the present invention will be described.

<Reaction Liquid Applying Device>

A reaction liquid applying device may be any device capable of applying reaction liquid onto an ink receiving medium, and conventionally known various devices may be used as needed. Specifically, a gravure offset roller, an inkjet head, a die coating device (die coater), and a blade coating device (blade coater) may be used. Application of reaction liquid by a reaction liquid applying device may be performed before application of the ink or after application of the ink, provided that the reaction liquid can be mixed (reacted) with the ink on an ink receiving medium. Preferably, reaction liquid is applied before application of the ink. Applying reaction liquid before application of the ink can inhibit bleeding in which adjacently applied inks are mixed, and beading in which a previously landed ink is attracted to subsequently landed ink during image printing by an inkjet system.

<Reaction Liquid>

The reaction liquid contains a component (ink viscosity-increasing component) that causes an increase in the viscosity of an ink. The increase in the viscosity of an ink refers to a phenomenon in which a coloring material and a resin, which are part of components contained in an ink, come into contact with an ink viscosity-increasing component resulting in chemical reaction or physical adsorption, and thereby an ink viscosity increase is recognized. The increase in the viscosity of an ink includes not only the case where an ink viscosity increase is recognized, but also the case where part of the components contained in the ink, such as a coloring material and a resin, aggregates, thereby locally increasing the viscosity. As a method of condensing part of the components included in an ink, reaction liquid which reduces the dispersion stability of pigments in an aqueous ink may be used. The ink viscosity-increasing component has an effect of reducing the fluidity of an ink and/or part of the components included in an ink on an ink receiving medium and of inhibiting bleeding and beading during formation of the first image. Increasing in the viscosity of an ink is also referred to as "viscously thickening an ink". As such ink viscosity-increasing component, a publicly known component, such as a multi-charged metal ion, an organic acid, a cationic polymer, and porous particles, may be used. Among all, particularly, a multi-charged metal ion and an organic acid are preferred. Also, it is preferable that multiple types of ink viscosity-increasing component be contained. It is preferable that the content of ink viscosity-increasing component in the reaction liquid be 5% by mass or greater with respect to the total mass of reaction liquid.

The multi-charged metal ion includes, for instance, a divalent metal ion such as $Ca^{2+}$, $Cu^{2+}$, $Ni^{2+}$, $Mg^{2+}$, $Sr^{2+}$, $Ba^{2+}$, and $Z^{2+}$, and a trivalent metal ion such as $Fe^{3+}$, $Cr^{3+}$, $Y^{3+}$, and $Al^{3+}$.

Also, the organic acid includes, for instance, oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, piron carboxylic acid, pyrrole carboxylic acid, furancarboxylic acid, pyridinecarboxylic acid, coumarin acid, thiophenecarboxylic acid, nicotinic acid, hydroxysuccinic acid, and dioxy-succinic acid.

The reaction liquid may contain a proper amount of an organic solvent with a low volatility as the aqueous liquid medium. The water to be used in this case is preferably deionized water produced by ion exchange. Also, an organic solvent, which may be used for the reaction liquid applied to the present invention, is not particularly limited, and a publicly known organic solvent may be used.

Furthermore, the reaction liquid may be used with adjusted surface tension and viscosity as needed by adding a surface-active agent and/or a viscosity modifying agent to the reaction liquid. A material used is not particularly restricted as long as the material can coexist with the ink viscosity-increasing component. The surface-active agent specifically used includes a fluorochemical surface-active agent of an acetylene glycol ethylene oxide adduct (product name "Acetyrenol E100" manufactured by Kawaken Fine Chemicals Co., Ltd), and a perfluoroalkyl ethylene oxide adduct (product name "Megafac F444" manufactured by DIC Corporation, product name "Capstone FS-3100" manufactured by The Chemours Company LLC, and ZonylFS3100 manufactured by Du Pont Company), and a silicone-based surface-active agent of a polyether-modified polydimethylsiloxane adduct (product name "BYK349" manufactured by BYK Inc.).

It is to be noted that an aqueous liquid component obtained by causing the reaction liquid to react with the ink may be utilized as wetting liquid. In this case, the composition of the ink and/or the reaction liquid is adjusted so that the angle of contact with the first surface of the water-repellent porous body of the mixture is less than 90°. The adjustment of angle of contact of the mixture may be made by the selection of the type and additive amount of the surface-active agent to be added.

<Ink Applying Device>

An inkjet head is used as the ink applying device that applies an ink. The inkjet head has, for instance, a form of discharging an ink by causing film boiling in the ink to form air bubbles by an electric-heat conversion body, a form of discharging an ink by an electric-machine conversion body, and a form of discharging an ink by utilizing static electricity. A publicly known inkjet head may be used in the present invention. Among all, particularly, from the viewpoint of high speed and high-density printing, an inkjet head utilizing an electric-heat conversion body is preferably used. For drawing, an image signal is received, and a necessary amount of ink is applied to each position.

Although the amount of applied ink may be expressed in terms of an image concentration (duty) or an ink thickness, in the present embodiment, the amount of applied ink (g/m2) is given by an average value obtained by dividing the product of the mass of each ink dot and the number of application (the number of discharge) by a printing area. It is to be noted that a maximum amount of applied ink in an image region indicates the amount of ink applied to an area of at least 5 mm2 in an region used as information on the ink receiving medium from the viewpoint of removing the liquid content in the ink.

The ink jet printing apparatus of the present invention may have multiple inkjet heads in order to apply the ink of each color onto the ink receiving medium. For instance, when each color image is formed using yellow ink, magenta ink, cyan ink, and black ink, the ink jet printing apparatus has four inkjet heads that discharge the above-mentioned respective four types of ink onto the ink receiving medium.

Also, an ink applying member may include an inkjet head that discharges an ink (clear ink) not containing a coloring material.

The components of the ink applied to the present invention will be described.

(Coloring Material)

Pigment or a mixture of dye and pigment may be used as the coloring material contained in the ink applied to the present invention. The type of pigment which may be used as the coloring material is not particularly limited. The specific examples of pigment include an inorganic pigment such as carbon black; and an organic pigment such as azo-based, phthalocyanine-based, quinacridone-based, isoindolinone-based, imidazolone-based, diketo-pyrrolo-pyrrole-based, and dioxazine-based pigments. One type or two or more types of these pigments may be used as necessary.

The type of dye which may be used as the coloring material is not particularly limited. The specific examples of dye include a direct dye, an acid dye, a basic dye, a disperse dye, and an edible dye, and a dye having an anionic group may be used. The specific examples of dye skeleton include an azo skeleton, a triphenylmethane skeleton, a phthalocyanine skeleton, an azaphthalocyanine skeleton, a xanthene skeleton, and an anthrapyridone skeleton.

The content of pigment in the ink is preferably 0.5% by mass or greater and 15.0% by mass or less with respect to the total mass of the ink, and is more preferably 1.0% by mass or greater and 10.0% by mass or less.

(Dispersing Agent)

A publicly known dispersing agent used for the ink for inkjet may be used as the dispersing agent for dispersing pigments. Among all, in an aspect of the present invention, a water-soluble dispersing agent having both a hydrophilic moiety and a water-repellent moiety is preferably used. Particularly, a pigment dispersing agent composed of a copolymerized resin including at least a hydrophilic monomer and a water-repellent monomer is preferably used. Each monomer used here is not particularly restricted, and a publicly known monomer is preferably used. Specifically, the water-repellent monomer includes styrene and other styrene derivatives, alkyl (meth) acrylate, and benzyl (meth) acrylate. Also, the hydrophilic monomer includes acrylic acid, methacrylic acid, and maleic acid.

The acid value of the dispersing agent is preferably 50 mgKOH/g or greater and 550 mgKOH/g or less. Also, the weight average molecular weight of the dispersing agent is preferably 1000 or greater and 50000 or less. The mass ratio (pigment: dispersing agent) of pigment to dispersing agent is preferably in the range of 1:0.1 to 1:3.

Also, the pigment itself having a modified surface to allow dispersion without using a dispersing agent, so-called a self-dispersed pigment is preferably used.

(Resin Fine Particles)

The ink applied to the present invention may be used with various particles having no coloring material contained. Among all, resin particles may have an effect on improving the image quality and the fixation, and thus are also preferred.

The material of resin particles which may be used for the present invention is not particularly limited, and a publicly known resin may be used as needed. Specifically, the material includes polyolefin, polystyrene, polyurethane, polyester, polyether, polyurea, polyamide, polyvinyl alcohol, poly (meth) acrylic acid and its base, poly (meta) alkyl acrylate, single polymers such as polydiene, and copolymer polymerized by combining multiple monomers for generating these single polymers. The weight average molecular weight (Mw) of the resin is preferably in the range of 1,000 or greater and 2,000,000 or less. Also, the amount of the resin particles in the ink is preferably 1% by mass or greater and 50% by mass or less with respect to the total mass of the ink, and is more preferably 2% by mass or greater and 40% by mass or less.

Furthermore, in an aspect of the present invention, the ink is preferably used as a resin particle dispersion in which resin particles are dispersed in the liquid. Although the technique for dispersion is not particularly limited, a dispersing element using a resin in which monomers having a dissociable group are homopolymerized or multiply copolymerized, so-called a self-dispersed resin particle dispersion is preferred. Here, the dissociable group includes a carboxyl group, a sulfonic group, and a phosphate group, and the monomer having the dissociable group includes acrylic acid and methacrylic acid. Also, a dispersing element in which resin particles are dispersed by an emulsifier, so-called an emulsifier dispersed resin particle dispersion may also be preferably used in the present invention similarly. Regardless of low molecular weight or high molecular weight, a publicly known surface-active agent is preferable as the emulsifier mentioned here. The surface-active agent is preferably a non-ionic surface-active agent or a surface-active agent having the same charge as the resin particles.

The resin particle dispersion used in an aspect of the present invention preferably has a dispersion particle diameter of 10 nm or greater and 1000 nm or less, more preferably has a dispersion particle diameter of 50 nm or greater and 500 nm or less, and further preferably has a dispersion particle diameter of 100 nm or greater and 500 nm or less.

Also, when a resin particle dispersion used in an aspect of the present invention is produced, it is also preferable to add various additive agents for stabilization. The additive agents include, for instance, n-hexadecane, dodecyl methacrylate, stearyl methacrylate, chlorobenzene, dodecylmercaptan, blue dye (bluing agent), and polymethylmethacrylate.

(Surface-Active Agent)

The ink which can be used for the present invention may contain a surface-active agent. Specifically, an acetylene glycol ethylene oxide adduct (product name "Acetyrenol E100" manufactured by Kawaken Fine Chemicals Co., Ltd) may be used as the surface-active agent. The amount of surface-active agent in the ink is preferably 0.01% by mass or greater and 5.0% by mass or less with respect to the total mass of the ink.

As already described in the paragraph of Reaction Liquid, the composition of the ink and/or the reaction liquid can be adjusted so that the angle of contact with the first surface of the porous body of the aqueous liquid component obtained by causing the reaction liquid to react with the ink is less than 90°. The adjustment of angle of contact of the mixture may be made by the selection of the type and additive amount of the surface-active agent to be added.

(Water And Water-Soluble Organic Solvent)

An aqueous ink containing at least water as the liquid medium is used as the ink. An aqueous pigment ink containing at least pigment as the coloring material may be used as the aqueous ink.

The liquid medium may further contain a water-soluble organic solvent as necessary. The water is preferably deionized water produced by ion exchange. Also, the content of water in the ink is preferably 30% by mass or greater and 97% by mass or less with respect to the total mass of the ink.

Also, the type of water-soluble organic solvent to be used is not particularly limited, and any publicly known organic solvent may be used. Specifically, the type of water-soluble organic solvent includes glycerin, diethylene glycol, polyethylene glycols, polypropylene glycol, ethylene glycol, propylene glycol, butylene glycol, triethylene glycol, thiodiglycol, hexylene glycol, ethylene glycol monomethyl ether, diethylene glycol monomethyl ether, 2-pyrrolidone, ethanol, and methanol. Needless to say, two or more types selected from these may be mixed and used.

Also, the content of water-soluble organic solvent in the ink is preferably 3% by mass or greater and 70% by mass or less with respect to the total mass of the ink, and is more preferably 50% by mass or greater and 95% by mass or less with respect to the total mass of the ink.

(Other Additive Agents)

The ink which may be used for the present invention may contain various additive agents other than the above-mentioned components as necessary, such as a pH adjuster, an anticorrosive agent, an antiseptic agent, an antifungal agent, an antioxidizing agent, an antireduction agent, a water-soluble resin and its neutralizer, and a viscosity modifying agent.

<Liquid Absorbing Member>

In the present invention, at least part of the aqueous liquid component is absorbed from the first image by bringing the first image into contact with a liquid absorbing member including a porous body, and the content of the liquid component in the first image is reduced.

Let the first surface be the contact surface of the liquid absorbing member with the first image, and a porous body is disposed in the first surface.

(Porous Body)

The porous body preferably has a small pore diameter in order to reduce adhesion of the coloring material of the ink, and the pore diameter of the side (the first surface), to be in contact with the first image, of the porous body is preferably 1 µm or less. In the present invention, the pore diameter indicates an average diameter, which can be measured by a publicly known means, for instance, the mercury intrusion technique, the nitrogen adsorption method, or SEM image observation.

Also, the thickness of the porous body is preferably reduced to achieve uniformly high air permeability. The air permeability can be indicated by a Gurley value defined in JIS P8117, and the Gurley value is preferably 10 seconds or less. Although the shape of the porous body is not particularly restricted, a roller shape, or a belt shape may be used.

However, when the porous body is made thinner, a necessary capacity for absorbing the liquid component may not be sufficiently ensured, thus the porous body may have a multilayered structure. Also, in the liquid absorbing member, it is sufficient that a layer to be in contact with an image on the transfer body be a porous body, and a layer not to be in contact an image on the transfer body may not be a porous body.

Also, a process of manufacturing a porous body is not particularly restricted, and a conventionally widely used manufacturing process is applicable. As an example, the manufacturing process for a porous body, obtained by biaxial stretching a resin containing polytetrafluoroethylene described in Japanese Patent No. 1114482 may be used.

In the present invention, the material for forming a porous body is not particularly limited, and it is possible to use both of a hydrophilic material having an angle of contact with water of less than 90° and a water-repellent material having an angle of contact with water of greater than 90°.

In the case of a hydrophilic material, the angle of contact with water is more preferably 40° or less. When the first layer is composed of a hydrophilic material, the first layer provides an effect of sucking up an aqueous liquid component, particularly water by a capillary force.

The hydrophilic material includes polyolefin (such as polyethylene (PE)), polyurethane, nylon, polyamide, polyester (such as polyethylene terephthalate (PET)), and polysulfone (PSF).

The porous body preferably has water repellency to reduce the affinity with the coloring material contained in the first image. A water-repellent porous body preferably has an angle of contact with pure water of 90° or greater. As a result of intensive study by the inventors, it turned out that adhesion of the coloring material of the ink to the porous body can be reduced by using a porous body having an angle of contact with pure water of 90° or greater. The angle of contact in the present description is given by, when measurement liquid is dropped on an object, the angle formed by the surface of an object and the tangent of liquid drop at the portion where the liquid drop is in contact with the object. Although there were some types of techniques for measurement, the inventors measured the water repellency in conformity with the technique described in "6. sessile drop method" in JIS R3257.

Also, although the material of the water-repellent porous body is not particularly limited as long as the angle of contact with pure water is 90° or greater, the material is preferably composed of a water-repellent resin. In addition, the water-repellent resin is preferably a fluororesin. Specifically, the fluororesin includes polytetrafluoroethylene (hereinafter PTFE), polychlorotrifluoroethylene (PCTFE), polyvinylidene fluoride (PVDF), polyvinyl fluoride (PVF), perfluoroalkoxy-fluororesin (PFA), tetrafluoroethylene-hexafluoropropylene copolymer (FEP), ethylene-tetrafluoroethylene copolymer (ETFE), and ethylene-chlorotrifluoroethylene copolymer (ECTFE). One type or two or more types of these resins may be used as necessary, and a configuration may be adopted in which multiple films are stacked. In these, polytetrafluoroethylene is preferable.

<Multilayered Configuration>

Next, an embodiment when the porous body is in a multilayered configuration will be described. Here, a description is given by assuming that the first layer is on side in contact with the first image, and the second layer is the layer stacked on the surface opposite to the contact surface, with the first image, of the first layer. Furthermore, the multilayered configuration is expressed sequentially by the order of stacked layer from the first layer. In the present description, the first layer may be referred to as the "absorption layer", and the second and subsequent layer may be referred to as the "support layer".

The first layer can be composed of the porous body previously described in the paragraph of "(Porous Body)".

In order to reduce adhesion of the coloring material and enhance the cleaning performance, the above-described water-repellent porous body is preferably used for the first layer. One type or two or more types of these resins may be used as necessary, and a configuration may be adopted in which multiple films are stacked in the first layer.

When the first layer is composed of a water-repellent material, almost no effect of sucking up an aqueous liquid component is provided by a capillary force. When the first layer comes into contact with an image for the first time, it may take time to suck up the aqueous liquid component. For this reason, the first layer is preferably impregnated with wetting liquid which has an angle of contact with the first layer of less than 90°.

It is possible to impregnate the first layer with wetting liquid by applying the wetting liquid to the first surface of the liquid absorbing member by a coating method or the like. The wetting liquid is preferably prepared by mixing liquid medium containing water with a surface-active agent or liquid having a low angle of contact with the first layer. The wetting liquid, with which the porous body is impregnated, is gradually replaced by the aqueous liquid component absorbed from the first image, and thus the absorption efficiency of the first layer may be reduced. Thus, it is preferable to coat the first surface of the porous body included in the liquid absorbing member with wetting liquid by application of wetting liquid for every predetermined number.

Also, the first layer of the aqueous liquid component contained in the first image is maintained to have an angle of contact with the first surface of less than 90° by adjusting the composition of the reaction liquid and/or the ink, and thus the mixture can be utilized as the wetting liquid. In this case, the angle of contact of the mixture of these can be adjusted by mixing the reaction liquid and/or the ink with a surface-active agent or liquid having a low angle of contact with the first surface of the water-repellent porous body.

In the present invention, the film thickness of the first layer is preferably 50 µm or less. It is more preferable that the film thickness be 30 µm or less. In Examples of the present invention, the film thickness was measured at 10 arbitrary points by a rectilinear micrometer OMV_25 (manufacture by Mitutoyo), and the film thickness was obtained by calculating the average value of the measured thicknesses.

The first layer can be manufactured by a publicly known method of manufacturing a thin porous film. For instance, after a sheet-shaped resin material is obtained by a method such as an extrusion molding, the first layer can be obtained by drawing the sheet-shaped resin material to a predetermined thickness. Also, a porous film can be obtained by adding a plasticizer such as paraffin to the material for extrusion molding, and removing the plasticizer by heating or the like during drawing. The pore diameter can be regulated by adjusting the additive amount of plasticizer to be added and a draw ratio as needed.

[Second Layer]

In the present invention, the second layer is preferably a layer having air permeability. Such a layer may be non-woven fabric of resin fibers or woven fabric. Although the material for the second layer is not particularly limited, the aqueous liquid component absorbed from an image preferably has an equivalent or lower angle of contact with the first layer so that the liquid absorbed in the first layer side does not flow backward. Specifically, the material for the second layer is preferably selected from a single material such as polyolefin (such as polyethylene (PE), polypropylene (PP)), polyurethane, nylon, polyamide, polyester (such as polyethylene terephthalate (PET)), and polysulfone (PSF), or composite materials of these. Also, the second layer is preferably a layer having a pore diameter larger than the pore diameter of the first layer.

[Third Layer]

In the present invention, the porous body in a multilayered structure may have a configuration of three or more layers. The third or subsequent layer (also called the third layer) is preferably a non-woven fabric from the viewpoint of rigidity. As the material, the same material as the second layer is used.

[Other Materials]

The liquid absorbing member may have a reinforcement member which reinforces the lateral side of the liquid absorbing member, other than the porous body in the above-mentioned stacked layer structure. Also, the liquid absorbing member may have a joining member when a belt-shaped member is formed by connecting the longitudinal ends of an elongated seat-shaped porous body. A non-porous tape material may be used as such material, and it is sufficient that the material be disposed at a position or with a period not in contact with an image.

[Method of Manufacturing Porous Body]

A method of forming a porous body by stacking the first layer and the second layer is not particularly limited. The layers may be simply stacked or the layers may be bonded to each other using a method such as lamination by adhesive agent or lamination by heating. In the present invention heat lamination is preferable from the viewpoint of air permeability. Also, for instance, part of the first layer or the second layer may be melted by heating and may be stacked adhesively. Also, a fusion material like hot melt powder may be interposed between the first layer and the second layer, and the layers may be stacked adhesively by heating. When the third and subsequent layers are stacked, the layers may be stacked at one time or may be stacked sequentially, and the order of stacking may be selected as appropriate.

In a heating step, the lamination method is preferable in which the porous body is nipped by a heated roller, and the porous body is heated while being pressurized.

Next, a specific example of an embodiment of the ink jet printing apparatus of the present invention will be described.

The ink jet printing apparatus of the present invention includes: an ink jet printing apparatus that forms a first image on a transfer body as an ink receiving medium, and transfers a second image to a printing medium, the second image with part of the aqueous liquid component absorbed by a liquid absorbing member; and an ink jet printing apparatus that forms a first image on a printing medium as an ink receiving medium. In the present invention, the former ink jet printing apparatus is hereinafter referred to as the transfer type ink jet printing apparatus for the sake of convenience, and the latter ink jet printing apparatus is hereinafter referred to as the direct drawing type ink jet printing apparatus for the sake of convenience.

Hereinafter each ink jet printing apparatus will be described.

(Transfer Type Ink Jet Printing Apparatus)

Figure 2:
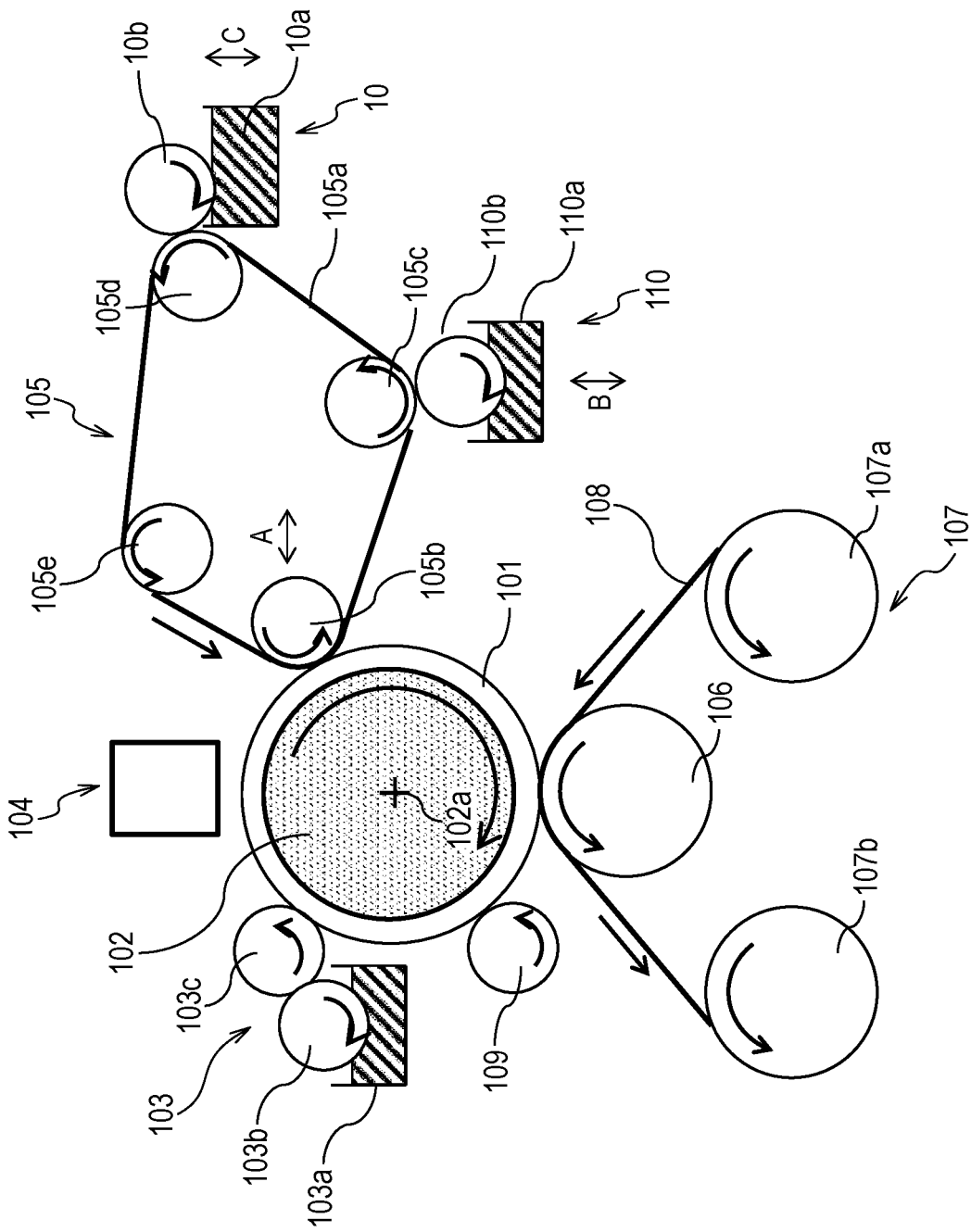
FIG. 2 is a schematic view illustrating an example of a configuration of a transfer type ink jet printing apparatus 2 in the present invention.
Figure 3:
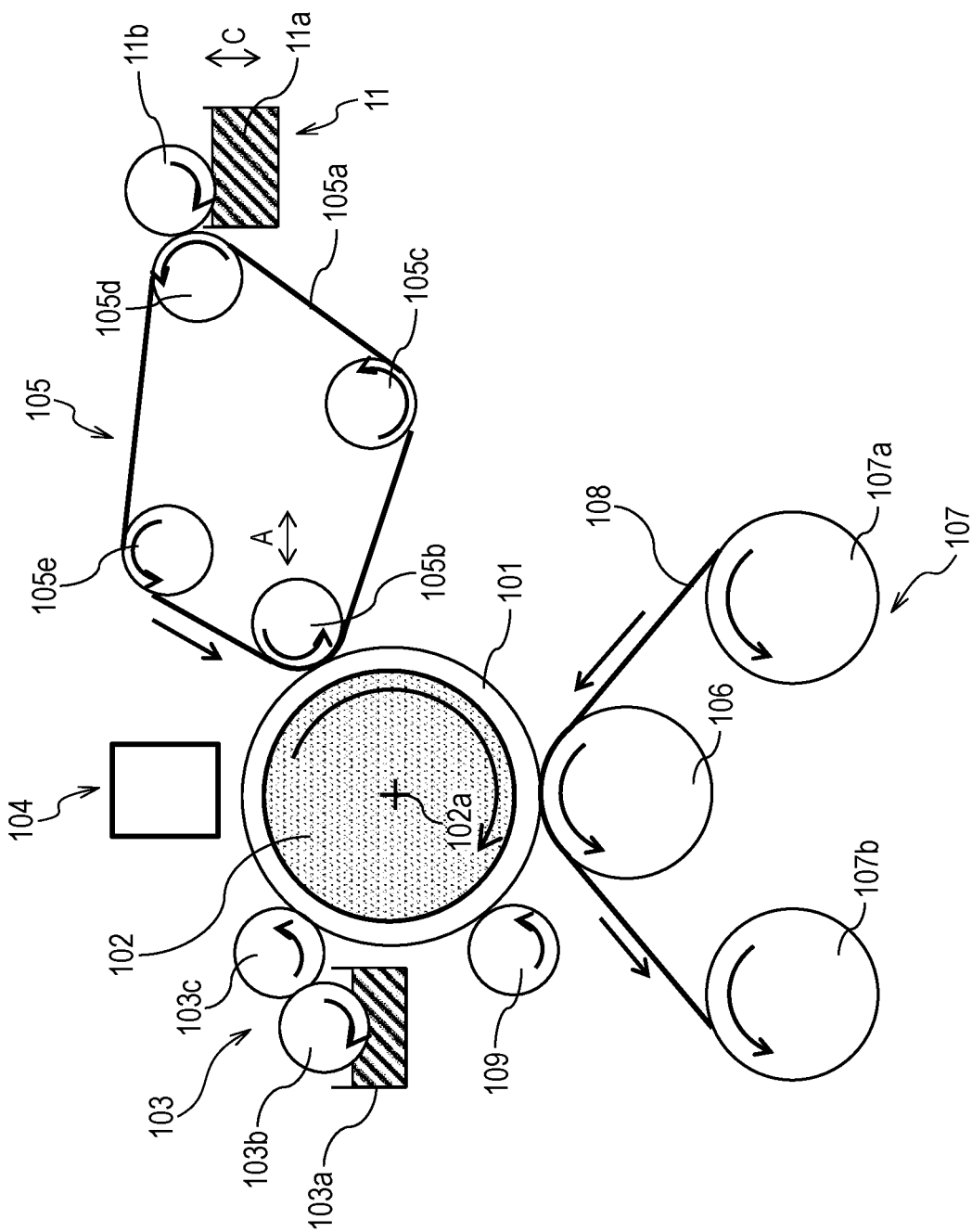
FIG. 3 is a schematic view illustrating an example of a configuration of a transfer type ink jet printing apparatus 3 in the present invention.

FIGS. 1 to 3 are each a schematic view illustrating an example of a schematic configuration of transfer type ink jet printing apparatuses 1 to 3 in the present embodiment.

The transfer type ink jet printing apparatuses 1 to 3 include a transfer body 101 that temporarily holds a first image and a second image in which at least part of the aqueous liquid component is removed from the first image. In addition, the transfer type ink jet printing apparatuses 1 to 3 include a pressing member for transferring 106 that transfers the second image onto a printing medium such as paper on which an image is to be formed, that is, a printing medium for forming a final image according to the application as an object.

The transfer type ink jet printing apparatuses 1 to 3 each have a transfer body 101 supported by a support member 102; a reaction liquid applying device 103 that applies reaction liquid onto the transfer body 101; an ink applying device 104 that applies an ink onto the transfer body 101 to which the reaction liquid has been applied, and forms the first image on the transfer body; a liquid absorbing device 105 that absorbs a liquid component from the first image on the transfer body; and a transfer member 106 that transfers the second image on the transfer body onto a printing medium 108 such as paper, the second image with the liquid component removed by pressing the printing medium 108. Also, a transfer type ink jet printing apparatus 100 may have a cleaning member for transfer body 109 that cleans the surface of the transfer body 101 after the second image is transferred to the printing medium 108.

The support member 102 rotates around the center at a rotational shaft 102a in the direction of the arrow of FIG. 1.

The rotation of the support member 102 causes the transfer body 101 to be moved. The reaction liquid by the reaction liquid applying device 103, and the ink by the ink applying device 104 are sequentially applied onto the transfer body 101 moved, and the first image is formed on the transfer body 101. The first image formed on the transfer body 101 is moved to a position in contact with a liquid absorbing member 105a included in the liquid absorbing device 105 by the movement of the transfer body 101. The liquid absorbing member 105a of the liquid absorbing device 105 is moved in synchronization with the rotation of the transfer body 101. The first image formed on the transfer body 101 passes through a state in contact with the liquid absorbing member 105a which is moved. During the period, the liquid absorbing member 105a removes the liquid component containing at least the aqueous liquid component from the first image. Since the first image passes through a state in contact with the liquid absorbing member 105a, the liquid component contained in the first image is removed. In the state of contact, it is preferable for effectively functioning the liquid absorbing member 105a that the liquid absorbing member 105a be pressed against the first image by a predetermined pressing force.

The removal of the liquid component can be expressed from a different point of view as concentrating the ink constituting the first image formed on the transfer body. Concentrating the ink means that the proportion of the solid content contained in the ink, such as coloring material and resin, with respect to the liquid component contained in the ink increases owing to reduction in the liquid component.

The second image after the liquid component is removed from the first image is moved by the movement of the transfer body 101 to a transferring unit which comes into contact with the printing medium conveyed by a printing medium conveying device 107. While the second image with the liquid component removed is in contact with the printing medium 108, an image (ink image) is transferred onto the printing medium by the pressing member 106 pressing against the printing medium 108. The post-transfer ink image transferred onto the printing medium 108 is a reverse image of the second image. In the subsequent description, the post-transfer ink image may be referred to as a third image independently from the above-described first image (ink image before liquid removal), the second image (ink image after liquid removal).

Since an image is formed on the transfer body after the reaction liquid is applied, then the ink is applied on the transfer body, the reaction liquid remains on a non-image region (non-ink image formation region) without reacting with the ink. In the present device, the liquid absorbing member 105a comes into contact (pressure contact) with not only an image but also the unreacted reaction liquid, and the liquid component of the reaction liquid is additionally removed from the surface of the transfer body 101. Therefore, although the expression "the liquid component is removed from an image" is used for description in the above, the expression is not used in a limited sense that the liquid component is removed only from an image, but is used in a sense that the liquid component may be removed at least from the image on the transfer body. For instance, it is also possible to remove the liquid component in the reaction liquid applied to a region outwardly of the first image as well as in the first image. The liquid component has no certain form, has fluidity, and substantially constant volume, and is not particularly limited. For instance, water and an organic solvent contained in the ink and the reaction liquid may be the liquid component.

Also even when the above-described clear ink is contained in the first image, the ink can be concentrated by liquid absorbing treatment. For instance, when clear ink is applied onto a color ink containing the coloring material applied onto the transfer body, 101 the clear ink is extensively present on the surface of the first image, or the clear ink is partially present at one portion or multiple portions on the surface of the first image, and color ink is present on other portions. In the first image, at a portion where the clear ink is present on the color ink, the porous body absorbs the liquid component of the clear ink on the surface of the first image, and the liquid component of the clear ink is moved. Accordingly, the liquid component in the color ink is moved to the porous body, and thus the aqueous liquid component in the color ink is absorbed. On the other hand, at a portion where the region of the clear ink and the region of the color ink are present on the surface of the first image, the liquid component of each of the color ink and the clear ink is moved to the porous body, and thus the aqueous liquid component is absorbed. The clear ink may contain a great amount of the component for improving the transferability of an image from the transfer body 101 to the printing medium. For instance, the content of a component may be increased, the component providing more adhesion to the printing medium by heating than the color ink.

The configuration of the transfer type ink jet printing apparatus of the present embodiment will be described below.

<Transfer Body>

The transfer body 101 has a surface layer including an image forming surface. Although various materials such as resins, ceramics may be used as appropriate as the member of the surface layer, a material having a high compressive elastic modulus is preferable in respect of durability. Specifically, an acrylic resin, acrylics silicone resin, fluoride containing resin, and condensation product obtained by condensing hydrolyzable organic silicon compound. In order to improve the wettability, and the transferability of the reaction liquid, surface treatment may be made and used. The surface treatment includes frame treatment, corona treatment, plasma treatment, polish treatment, roughening treatment, active energy ray irradiation treatment, ozonization, surfactant treatment, and silane coupling treatment. Some of these may be combined. Also, any surface shape may be provided in the surface layer.

Also, the transfer body preferably includes a compressible layer having a function of absorbing a pressure fluctuation. Provided with a compressible layer the transfer body allows deformation to be absorbed by the compressible layer, and is enabled to distribute local pressure fluctuation when the fluctuation occurs, and therefore maintain favorable transferability even in high-speed printing. The member for the compressible layer includes, for instance, acrylonitrile butadiene rubber, acrylic rubber, chloroprene rubber, urethane rubber, and silicone rubber. At the time of molding the above-mentioned rubber material, it is preferable that predetermined amounts of vulcanizing agent, vulcanizing accelerator be blended, and bulking agents such as foaming agents, hollow particles or salts be further blended as necessary to provide a porous property. Consequently, for various pressure fluctuations, air bubble portions are compressed according to a volume change, and thus deformation is small in a direction other than a compression direction, and more stable transferability, and durability can be obtained. Porous rubber materials may have a continuous pore structure in which the pores are continuous, and an independent pore structure in which the pores are independent from each other. In the present invention, either structure may be used, and these structures may be used in combination.

Furthermore, the transfer body preferably has an elastic layer between the surface layer and the compressible layer. Various materials such as resins, ceramics may be used as appropriate as the member of the elastic layer. Various elastomer materials, and rubber materials are preferably used in respect of machining characteristics. Specifically, for instance, fluoro silicone rubber, phenyl silicone rubber, fluorocarbon rubber, chloroprene rubber, urethane rubber, nitrile rubber, ethylene propylene rubber, crude rubber, styrene rubber, polyisoprene rubber, butadiene rubber, copolymer of ethylene/propylene/butadiene, and nitrile butadiene rubber may be used. Particularly, silicone rubber, fluoro silicone rubber, and phenyl silicone rubber are preferable in respect of dimensional stability, and durability because compression permanent distortion is small. In addition, these are also preferable in respect of transferability because the change in the elastic modulus due to a temperature is small.

Various adhesive agents and double-sided tapes may be used between the layers (the surface layer, the elastic layer, the compressible layer) constituting the transfer body in order to fix and hold these layers. In addition, to reduce lateral extension and maintain sturdiness when a device is mounted, a reinforcement layer having a high compressive elastic modulus may be provided. Also, woven fabric may serve as a reinforcement layer. The transfer body can be produced by combining the layers based on the above-mentioned materials in any manner.

The size of the transfer body can be freely selected according to a target print image size. The shape of the transfer body is not particularly restricted, and specifically, a seat shape, a roller shape, a belt shape, and an endless web shape may be used.

<Support Member>

The transfer body 101 is supported on the support member 102. Various adhesive agents and double-sided tapes may be used as the support method for the transfer body. Alternatively, a member for installation composed of a material such as metal, ceramic, resin may be mounted on the transfer body, and the transfer body may be supported on the support member 102 using the member for installation.

From the viewpoint of conveyance accuracy and durability, the support member 102 requires a certain level of structural strength. Metal, ceramic, resin and the like are preferably used for the material of the support member. Among all, particularly, in addition to provide the rigidity capable of sustaining the pressure in transfer, and dimensional accuracy, in order to improve the responsiveness of control by reducing the inertia during operation, aluminum, iron, stainless steel, an acetal resin, an epoxy resin, polyimide, polyethylene, polyethylene terephthalate, nylon, polyurethane, silica ceramics, and alumina ceramics are preferably used. In addition, using these in a combination is also preferable.

<Reaction Liquid Applying Device>

Each ink jet printing apparatus of the embodiment has the reaction liquid applying device 103 that applies reaction liquid to the transfer body 101. The reaction liquid applying device 103 of FIG. 1 indicates the case of a gravure offset roller that has a reaction liquid container 103*a* that contains the reaction liquid, and reaction liquid applying members 103*b*, 103*c* that apply the reaction liquid in the reaction liquid container 103*a* onto the transfer body 101.

<Ink Applying Device>

Each ink jet printing apparatus of the embodiment has the ink applying device 104 that applies an ink to the transfer body 101 to which the reaction liquid has been applied. The first image is formed by mixing the reaction liquid and the ink, and the liquid component is absorbed from the first image by the subsequent liquid absorbing device 105.

<Liquid Absorbing Device>

In the present embodiment, the liquid absorbing device 105 has the liquid absorbing member 105a, and a pressing member for liquid absorption 105b that presses the liquid absorbing member 105a against the first image on the transfer body 101.

The pressing member 105b is operated to press the second surface of the liquid absorbing member 105a, thereby causing the first surface to come into contact with the outer circumferential surface of the transfer body 101 to form a nip portion, through which the first image is passed, and thus liquid absorption treatment can be performed on the first image. The region which allows pressure contact of the liquid absorbing member 105a against the outer circumferential surface of the transfer body 101 is used as a liquid absorption treatment region.

The position of the pressing member 105 with respect to the transfer body 101 can be adjusted by a position control mechanism (not illustrated), and for instance, round movement in the direction of arrow A illustrated in FIGS. 1 to 3 is enabled, and at the timing when liquid absorption treatment is needed, the liquid absorbing member 105a is brought into contact with the outer circumferential surface of the transfer body 101 or can be spaced apart from the outer circumferential surface.

The shape of the liquid absorbing member 105a and the pressing member 105b is not particularly restricted. For instance, as illustrated in FIG. 1, a configuration may be adopted in which the pressing member 105b has a cylindrical shape, the liquid absorbing member 105a has a belt shape, and the cylindrical-shaped pressing member 105b presses the belt-shaped liquid absorbing member 105a against the transfer body 101. Alternatively, a configuration may be adopted in which the pressing member 105b has a cylindrical shape, the liquid absorbing member 105a has a tubular shape formed on the circumferential surface of the cylindrical-shaped pressing member 105b, and the cylindrical-shaped pressing member 105b presses the tubular-shaped liquid absorbing member 105a against the transfer body.

In the present invention, the liquid absorbing member 105a preferably has a belt shape in consideration of the space in the ink jet printing apparatus.

Alternatively, the liquid absorbing device 105 having such belt-shaped liquid absorbing member 105a may have an extending member that extends over the liquid absorbing member 105a. In FIGS. 1, 105c, 105d, and 105e indicate extending rollers as the extending member. These rollers and the belt-shaped liquid absorbing member 105a extended over these rollers constitute the conveyance unit that conveys the porous body which performs liquid absorption treatment on the first image. The porous body can be carried in, carried out, and re-transmitted to and from the liquid absorption treatment region by the conveyance unit.

In FIGS. 1 to 3, the pressing member 105b also serves as a roller member that rotates similarly to the stretching roller. However, the invention is not limited to this.

In the liquid absorbing device 105, the liquid absorbing member 105a having the porous body is pressed against the first image by the pressing member 105b, and thus the liquid component contained in the first image is absorbed by the liquid absorbing member 105a, and the liquid component is removed from the first image. In addition to the present method of pressing the liquid absorbing member, as the method of removing the liquid component in the first image, conventionally used various techniques, for instance, a heating method, a low humidity air ventilation method, and a decompression method may be combined.

The temperature in the treatment for the first image by the porous body included in the liquid absorbing member based on the liquid absorbing device can be set to a range which allows a target liquid absorption effect to be achieved. When the wetting liquid in the pretreatment described above contains the surface-active agent for adjustment of contact angle, the temperature at the time of contact between the first surface of the porous body and the first image is preferably controlled at a temperature below the cloud point of the surface-active agent contained in the wetting liquid. Setting the temperature of the porous body below the cloud point of the surface-active agent in the wetting liquid allows the contact angle adjustment function, as the object, of the surface-active agent to be more effectively utilized.

When the temperature is set below the cloud point of the surface-active agent in the wetting liquid, the temperature at the time of contact between the first surface of the porous body and the first image is preferably selected from the range of 5° C. to 60° C.

Control of the temperature at the time of contact between the first surface of the porous body and the first image can be performed by disposing a temperature control unit having a temperature control device including a heating device and a cooling device to be installed as necessary according to the configuration of the ink jet printing apparatus. For instance, the temperature control device is disposed inside or in the vicinity of the outside of the pressing member 105b illustrated in FIGS. 2 and 3 so that the temperature control at the time of the contact can be performed. The heating device and the cooling device to be incorporated in the temperature control unit are not particularly limited, and publicly known heating device and cooling device can be used.

Hereinafter, the various conditions and the configuration in the liquid absorbing device 105 will be described in detail.

(Pretreatment)

In the liquid absorbing device 105, a wetting liquid applying device included in a wetting liquid applying unit may be provided as necessary.

When a porous body having water repellency is used, pretreatment can be performed by a wetting liquid applying device 10 that applies wetting liquid having an angle of contact with the porous body of less than 90° before the porous body comes into contact with the first image.

The wetting liquid has an angle of contact with the first surface of the porous body of less than 90°, and is not particularly limited as long as liquid absorbability as the object can be obtained. The wetting liquid contains an aqueous liquid medium, for instance, water or a mixture of water and a water-soluble organic solvent, and may be used with adjusted surface tension as needed by adding a surface-active agent to the wetting liquid. Although the material used for preparation of the wetting liquid is not particularly restricted, it is preferable to use a surface-active agent. It is preferable use at least one type of the silicone-based surface-active agent and the fluorochemical surface-active agent as the surface-active agent.

The surface-active agent specifically used includes fluorochemical surface-active agent F-444 (product name, manufactured by DIC Corporation), ZonylFS3100 (product name, manufactured by Du Pont Company), CapstoneFS-3100 (product name, manufactured by The Chemours Company LLC) and silicone-based surface-active agent BYK349 (product name, manufactured by BYK Inc.). The water is preferably deionized water produced by ion exchange. Also, the type of water-soluble organic solvent is not particularly limited, and any publicly known organic solvent, such as ethanol and isopropyl alcohol, may be used.

Also, although the method of applying wetting liquid of the porous body used in the present invention may be immersion, coating, liquid addition dropwise, etc., and is not particularly limited, the method is preferably the coating method in the roller pressure system in order to achieve stable application of wetting liquid and high-speed application in the device.

Also, although the method of applying wetting liquid of the porous body used in the present invention may be immersion, liquid addition dropwise, etc., and is not particularly limited, the method is preferably the coating method in the roller pressure system in order to achieve stable application of wetting liquid and high-speed application in the device.

FIG. 2 illustrates the wetting liquid applying device 10 in combination of a chamber containing the wetting liquid and an offset roller which serve as wetting liquid applying members 10a, 10b.

Also, in the present invention, the timing of application of wetting liquid is not particularly limited. When pretreatment is performed by circularly conveying a drum-formed or endless web-formed liquid absorbing member sequentially, treatment liquid may be applied for each rotation, or the timing of application of wetting liquid may be controlled, for instance, treatment liquid is applied once every several rotations.

The wetting liquid applying member is configured move up and down using a motor, a cam mechanism, an air cylinder, and may move toward and away from the liquid absorbing member.

In the embodiment illustrated in FIGS. 2 and 3, before the liquid absorbing member 105a is brought into contact with the first image, the wetting liquid for the pretreatment may be applied by the wetting liquid applying devices 10, 11 that apply wetting liquid to the porous body of the liquid absorbing member. The wetting liquid applying device can be installed so that the movement to a position at which wetting liquid is applied to the liquid absorbing member 105a, and movement away from the liquid absorbing member 105a, for instance, the round movement in the direction of illustrated arrow C is enabled at the necessary timing. For instance, the above-described round movement can be made by adopting a configuration in which the wetting liquid applying device is disposed on an ascent and descent stage (not illustrated) which can be ascended and descended by an air cylinder for ascent and descent (not illustrated).

Although the applied pressure of wetting liquid is not particularly limited, when the applied pressure is higher than or equal to 0.981 N/cm$^2$ (0.1 kgf/cm$^2$), stable application of wetting liquid and high-speed application in the device can be achieved, which is preferable. Also, when the pressure is lower than or equal to 98.07 N/cm$^2$ (10 kgf/cm$^2$), the structural load to the device can be reduced, which is preferable.

(Recovery Liquid)

In the present invention, the recovery liquid applying device 110 is provided, which applies recovery liquid to the liquid absorbing member 105a while the porous body included in the liquid absorbing member 105a is repeatedly brought into contact with the first image, the recovery liquid having a viscosity lower than the viscosity of the ink, the reaction liquid.

According to the study of the inventors, the following problem was found: while a porous body is repeatedly used for the liquid absorption treatment, the liquid content absorbed in the porous body is dried and the viscosity is increased inside the liquid absorbing-member 105a, thus the flow resistance inside the liquid absorbing-member 105a increases, and smeared image may occur.

In the present invention, to cope with the above-mentioned problem, during repetitive use of the porous body, the recovery liquid is applied to the liquid absorbing member 105a so that the increase in the viscosity of the liquid content inside the porous body is prevented, and smeared image is prevented.

As the method of applying recovery liquid applicable to the present invention, conventionally known various techniques may be used as appropriate. The examples include a method using an inkjet system, die coating, blade coating, a gravure roller, or a method combining an offset roller with these.

FIGS. 1 and 2 illustrate the recovery liquid applying device 110 including the recovery liquid applying unit in combination of a chamber containing recovery liquid and an offset roller which serve as recovery liquid applying members 110a, 110b.

It is preferable that the recovery liquid can be prepared with water as the main component, and further contain a water-soluble organic solvent. The water is preferably deionized water produced by ion exchange. Also, the type of water-soluble organic solvent is not particularly limited, and any publicly known organic solvent, such as ethanol and isopropyl alcohol, may be used. Also, the water-soluble organic solvent may contain a surface-active agent. Specifically, the surface-active agent includes Acetyrenol E100 (manufactured by Kawaken Fine Chemicals Co., Ltd).

The recovery liquid can also be prepared by a method that uses the ink components with the coloring material excluded, and adjusts the viscosity to a predetermined value. In this case, the various materials previously described in the paragraphs of "(Water And Water-Soluble Organic Solvent)" and "(Other Additive Agents)" related to ink may be used.

The recovery liquid has a viscosity lower than the viscosity of the ink and the reaction liquid. Due to the low viscosity, the liquid after application of the recovery liquid is likely to be decreased in viscosity, and have a reduced flow resistance during liquid absorption, so that it is possible to efficiently inhibit the occurrence of smeared image. Here, the viscosity of the ink and the reaction liquid, and the viscosity of the recovery liquid refer to the viscosities before drying. The viscosity of the recovery liquid is preferably lower than the viscosity of the ink and the reaction liquid by at least 0.3 mPa·s, and is more preferably lower than the viscosity by at least 0.6 mPa·s.

Furthermore, the recovery liquid preferably has a water concentration higher than the water concentration of the ink and the reaction liquid. Due to the high water concentration, when the recovery liquid is applied, the rate of replacement of the remaining solvent inside the absorber with the applied recovery liquid is increased. Therefore, the viscosity is decreased, the flow resistance during liquid absorption is reduced, and thus it is possible to efficiently inhibit the occurrence of smeared image.

In addition, the recovery liquid also preferably has a vapor pressure lower than the vapor pressure of the reaction liquid, the ink. The recovery liquid applied to the inside of the absorber is unlikely to evaporate, and the viscosity is unlikely to be increased, thus the amount of use of the recovery liquid can be reduced. The organic solvents which reduce the vapor pressure include ethylene glycol monoethyl ether, and ethylene glycol monomethyl ether.

Although the timing of application of the recovery liquid may be provided for each rotation, it is also preferred to apply the recovery liquid intermittently unless removal shortage occurs. The intermittent application of the recovery liquid allows the amount of use of the recovery liquid to be reduced. When the recovery liquid is applied intermittently, the recovery liquid applying device 110 is preferably to be spaced apart from the liquid absorbing member 105a (not illustrated) by a device that causes the recovery liquid applying device 110 to be spaced apart from the liquid absorbing member 105a. For instance, the recovery liquid applying device can be installed so that the movement to a position at which recovery liquid is applied to the liquid absorbing member 105a, and movement away from the liquid absorbing member 105a, for instance, the round movement in the direction of illustrated arrow B is enabled at the necessary timing. The round movement can be made by adopting a configuration in which the recovery liquid applying device is disposed on an ascent and descent stage (not illustrated) which can be ascended and descended by an air cylinder for ascent and descent (not illustrated).

Also, the control of the timing of application of the recovery liquid to the liquid absorbing member 105a for performing more efficient recovery treatment can be performed in a recovery liquid application controlling step which is instructed by a recovery liquid application control unit that controls whether or not to apply the recovery liquid to the porous body in the recovery liquid applying device.

It is preferable to use at least one type of the following pieces of information as the information for controlling whether or not to apply the recovery liquid and to use a minimum necessary amount of applied recovery liquid.

(A) The recovery liquid application timing which is obtained in a test run and enables effective recovery. For instance, an elapsed time after the recovery liquid was applied previous time until the recovery liquid is applied next time.
(B) A predicted value of the viscosity and/or the amount of the liquid in the porous body.
(C) An environmental information including the temperature and/or the humidity acquired by an environmental information acquisition device.
(D) An elapsed time until a liquid absorbing step after a recovery liquid applying step is completed, the elapsed time being acquired by an elapsed time acquisition device.

It is possible to perform control to apply the recovery liquid every certain time periods by utilizing the information (A).

The information (B) can be obtained from information on the initial viscosity and the application amounts of applied ink, reaction liquid, recovery liquid, and the elapsed time.

It is more preferable to detect publicly known temperature and/or humidity and to predict an increase in the viscosity of the liquid component inside the porous body by utilizing the information (C) obtained using a detection device capable of retrieving the information while grasping the temperature and/or the humidity inside the device. It is possible to predict an increase in the viscosity more accurately and to use a minimum necessary amount of applied recovery liquid by grasping the temperature and humidity in this manner.

Also, when the recovery liquid was not applied for a certain time or longer, liquid absorption treatment, if performed without applying the recovery liquid, may likely produce smeared image. For the porous body in such a state, it is preferable to utilize the information (D) and to let the porous body pass through the liquid absorption treatment region without working, that is, in an unused state without pressing the porous body by the pressing member 105a, and to re-use the porous body after once applying the recovery liquid to the porous body. The passing of the liquid absorbing member in an unused state through the liquid absorption treatment region can be performed through passing conveyance, for instance, by a conveyance device of the liquid absorbing member.

Such idling in the liquid absorption treatment region may be instructed by a control unit that controls the position of the pressing member 105a and the conveyance timing of the liquid absorbing member 105a.

Also, it is preferable to use the same recovery liquid as used in the pretreatment of the liquid absorbing member 105a to achieve simplification of the device.

Furthermore, the liquid absorbing device 105 can remove the reaction liquid, which is a liquid component, not only from an image, but also from a non-image region. Also, the recovery liquid used in the recovery liquid applying unit used in the present invention also has an effect of promoting removal of the reaction liquid remaining in a non-image region on the transfer body. The viscosity of the reaction liquid on the transfer body starts to increase due to drying of used solvent of the reaction liquid in the reaction liquid applying step, and depending on reaction liquid, a large amount of reaction liquid remains on the transfer body. Although specific principle is unknown, the liquid component contained in the liquid absorbing member may be squeezed out from the porous body near the inlet for a pressing step of the liquid absorbing member, and may be applied to the reaction liquid on the transfer body. Since the recovery liquid has a lower viscosity than that of the reaction liquid, the liquid component in the porous body, to which the recovery liquid is applied, has a lower viscosity, and thus the liquid component with a lower viscosity in the porous body is exuded and applied onto the transfer body. As a result, while the viscosity of the reaction liquid on the transfer body is decreased, the liquid absorption flow resistance at the time of pressing of the porous body included in the liquid absorbing member is reduced, and thus it is conjectured that removal of the reaction liquid in a non-image region is promoted.

Also, the recovery liquid applying device preferably serves as the above-described wetting liquid applying device as in the ink jet printing apparatus 3 illustrated in FIG. 3. In the case, liquid satisfying both necessary conditions for the recovery liquid and the wetting liquid has to be used, and the liquid has a lower viscosity than that of the ink and the reaction liquid, and the angle of contact with the liquid absorbing member is less than 90°. With the present configuration, the device can be simplified, and the cost can be reduced.

(Pressurizing Condition)

When the pressure of the porous body applied to an image on the transfer body is higher than or equal to 2.94 N/cm$^2$ (0.3 kgf/cm$^2$), solid-liquid separation can be achieved for the liquid component in the first image in a shorter time, and thus the liquid component can be removed from the first image, which is preferable. Also, when the pressure is lower than or equal to 98.07 N/cm$^2$(10 kgf/cm$^2$), the structural load to the device can be reduced, which is preferable. It is to be noted that the contact pressure of the porous body to the first image in the present invention indicates the nip pressure between the transfer body 101 and the liquid absorbing member 105a, and surface pressure measurement was performed by the surface pressure distribution measuring device (I-SCAN, manufactured by Nitta Corporation), and the value of nip pressure was calculated by dividing the weight in a pressurized region by the area.

(Application Time)

The application time during which the liquid absorbing member 105a is in contact with the first image is preferably less than or equal to 50 ms (milliseconds) in order to avoid adhesion of the coloring material in the first image to the liquid absorbing member. Here, the application time in the present description is calculated based on the above-mentioned surface pressure measurement by dividing a pressure detection width in a movement direction of an ink receiving medium by the movement speed of the ink receiving medium. Hereinafter, the application time is referred to as the liquid absorbing nip time.

In this manner, the liquid component is absorbed from the first image, and the second image with a reduced liquid component is formed on the transfer body 101. The second image is then transferred onto the printing medium 108 in the transfer unit. The device configuration and conditions for the transfer will be described.

<Pressing Member for Transferring>

In the present embodiment, while the second image and the printing medium 108 conveyed by the printing medium conveying device 107 are in contact with each other, the pressing member for transferring 106 presses the printing medium 108, thereby transferring an image (ink image) onto the printing medium 108. After the liquid component contained in the first image on the transfer body 101 is removed, the image is transferred to the printing medium 108, thus it is possible to obtain a recorded image with curl and cockling inhibited.

From the viewpoint of conveyance accuracy of the printing medium 108 and durability, the pressing member 106 requires a certain level of structural strength. Metal, ceramic, resin and the like are preferably used for the material of the pressing member 106. Among all, particularly, in addition to provide the rigidity capable of sustaining the pressure in transfer, and dimensional accuracy, in order to improve the responsiveness of control by reducing the inertia during operation, aluminum, iron, stainless steel, an acetal resin, an epoxy resin, polyimide, polyethylene, polyethylene terephthalate, nylon, polyurethane, silica ceramics, and alumina ceramics are preferably used. In addition, these may be used in a combination.

Although the pressing time during which the pressing member 106 presses the second image to transfer the second image on the transfer body 101 to the printing medium 108 is not particularly restricted, in order to favorably transfer the second image and not to impair the durability of the transfer body, the time is preferably 5 ms or greater and 100 ms or less. It is to be noted that the pressing time in the present embodiment indicates the time during which the printing medium 108 and the transfer body 101 are in contact with each other, and surface pressure measurement was performed by the surface pressure distribution measuring device (I-SCAN, manufactured by Nitta Corporation), and the value of the pressing time was calculated by dividing a conveyance direction length by a conveyance speed.

Also, although the pressure pressed by the pressing member 106 to transfer the second image on the transfer body 101 to the printing medium 108 is not particularly restricted, transfer is to be favorably performed and the durability of the transfer body is not to be impaired. For this purpose, the pressure is preferably 9.8 $N/cm^2$ (1 $kgf/cm^2$) or greater and 294.2 $N/cm^2$ (30 $kgf/cm^2$) or less. It is to be noted that the pressure in the present embodiment indicates the nip pressure between the printing medium 108 and the transfer body, 101 and surface pressure measurement was performed by the surface pressure distribution measuring device, and the value of nip pressure was calculated by dividing the weight in a pressurized region by the area.

Although the temperature when the pressing member 106 presses the second image to transfer the second image on the transfer body 101 to the printing medium 108 is not particularly restricted, the temperature is preferably higher than or equal to the glass transition point or the softening point of the resin component contained in the ink. Also, for heating, a heating device, which heats the second image on the transfer body, 101 the transfer body 101 and the printing medium 108, is preferably provided.

Although the shape of the transferring member 106 is not particularly restricted, for instance, a roller-shaped transferring member 106 may be used.

<Printing medium and Printing medium Conveying Device>

In the present embodiment, the printing medium 108 is not particularly limited, and any publicly known printing medium may be used. The printing medium includes a long object which is wound in a roll shape or sheets cut in a predetermined length. The material includes paper, plastic film, wood board, corrugated paper, and a metal film.

Also, in FIG. 1, the printing medium conveying device 107 for conveying the printing medium 108 includes a printing medium feeding roller 107a and a printing medium winding roller 107b. However, it is sufficient if the printing medium can be conveyed, and the configuration is not particularly limited to this.

<Control System>

Figure 5:
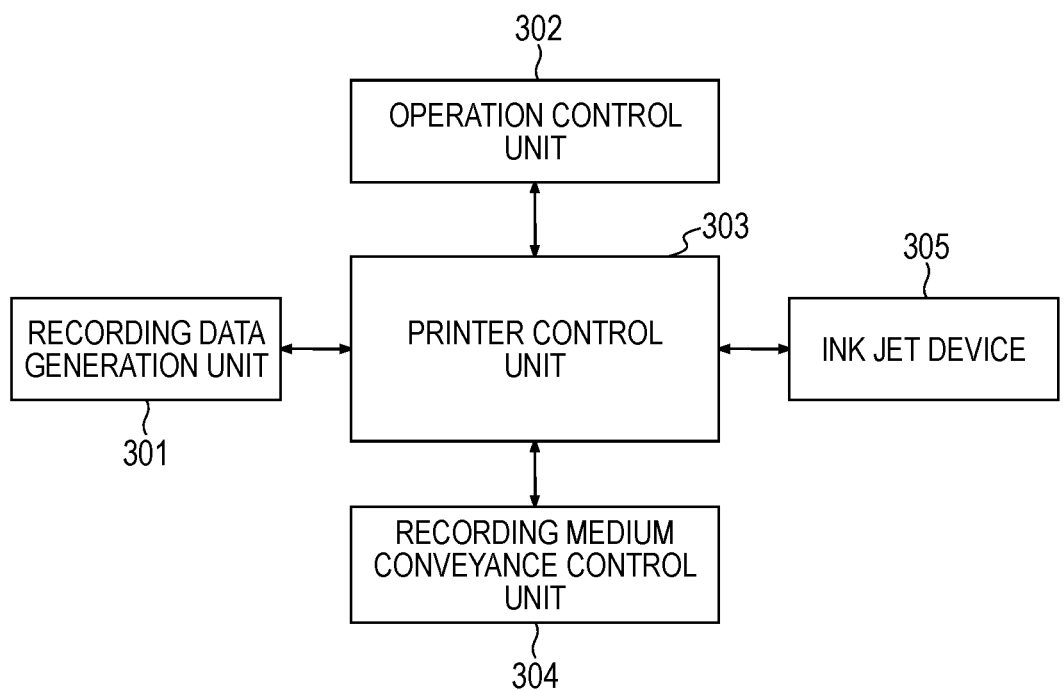
FIG. 5 is a block diagram illustrating a control system for an entire apparatus in the ink jet printing apparatuses illustrated in FIGS. 1 to 3.

The transfer type ink jet printing apparatus in the present embodiment has a control system that controls devices. FIG. 5 is a block diagram illustrating the control system for the entire apparatus in the transfer type ink jet printing apparatuses 1 to 3 illustrated in FIGS. 1 to 3.

In FIG. 5, 301 indicates a printing data generation unit such as an external print server, 302 indicates an operation control unit such as an operation panel, 303 indicates a printer control unit for carrying out a printing process, 304 indicates a printing medium conveyance control unit for conveying a printing medium, and 305 indicates an ink jet device for printing.

Figure 6:
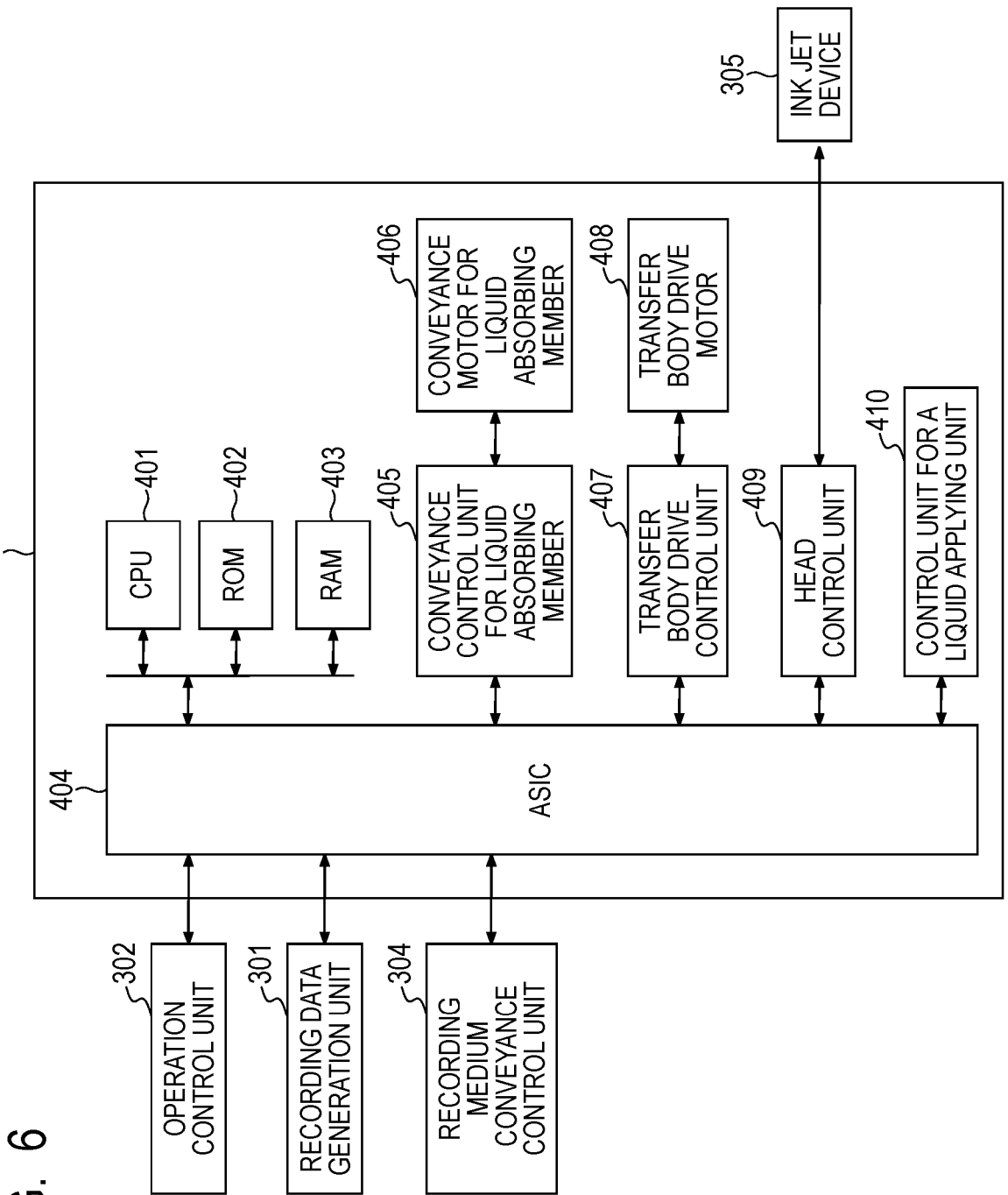
FIG. 6 is a block diagram of a printer control unit in the transfer type ink jet printing apparatus illustrated in FIG. 1.

FIG. 6 is a block diagram of the printer control unit in the transfer type ink jet printing apparatus illustrated in FIG. 1. 401 indicates a CPU that controls the entire printer, 402 indicates a ROM for storing a control program of the CPU, and 403 indicates a RAM for executing a program. 404 indicates an application specific integrated circuit (ASIC) including a network controller, a serial IF controller, a controller for head data generation, and a motor controller. 405 indicates a conveyance control unit for liquid absorbing member for driving a conveyance motor for liquid absorbing member 406, which is command-controlled from ASIC 404 via serial IF. 407 indicates a transfer body drive control unit for driving a transfer body drive motor 408, which is similarly command-controlled from ASIC 404 via serial IF. 409 indicates a head control unit that performs final discharge data generation, drive voltage generation of an ink jet device 305 and the like. 410 indicates a control unit of the liquid applying unit, which can be utilized as an ascent and descent control unit of the recovery liquid applying device for driving the air cylinder for ascent and descent (not illustrated) of the recovery liquid applying device, that is, can be utilized as the recovery liquid application control unit. A control unit 410 is command-controlled from ASIC 404 via serial IF.

It is to be noted that the recovery liquid applying device and the wetting liquid applying device illustrated in FIGS. 2 and 3 can also be controlled by the control unit 410.

(Direct Drawing Type Ink Jet Printing Apparatus)

Other embodiments in the present invention include a direct drawing type ink jet printing apparatus. In the direct drawing type ink jet printing apparatus, an ink receiving medium is a printing medium on which an image is to be formed.

Figure 4:
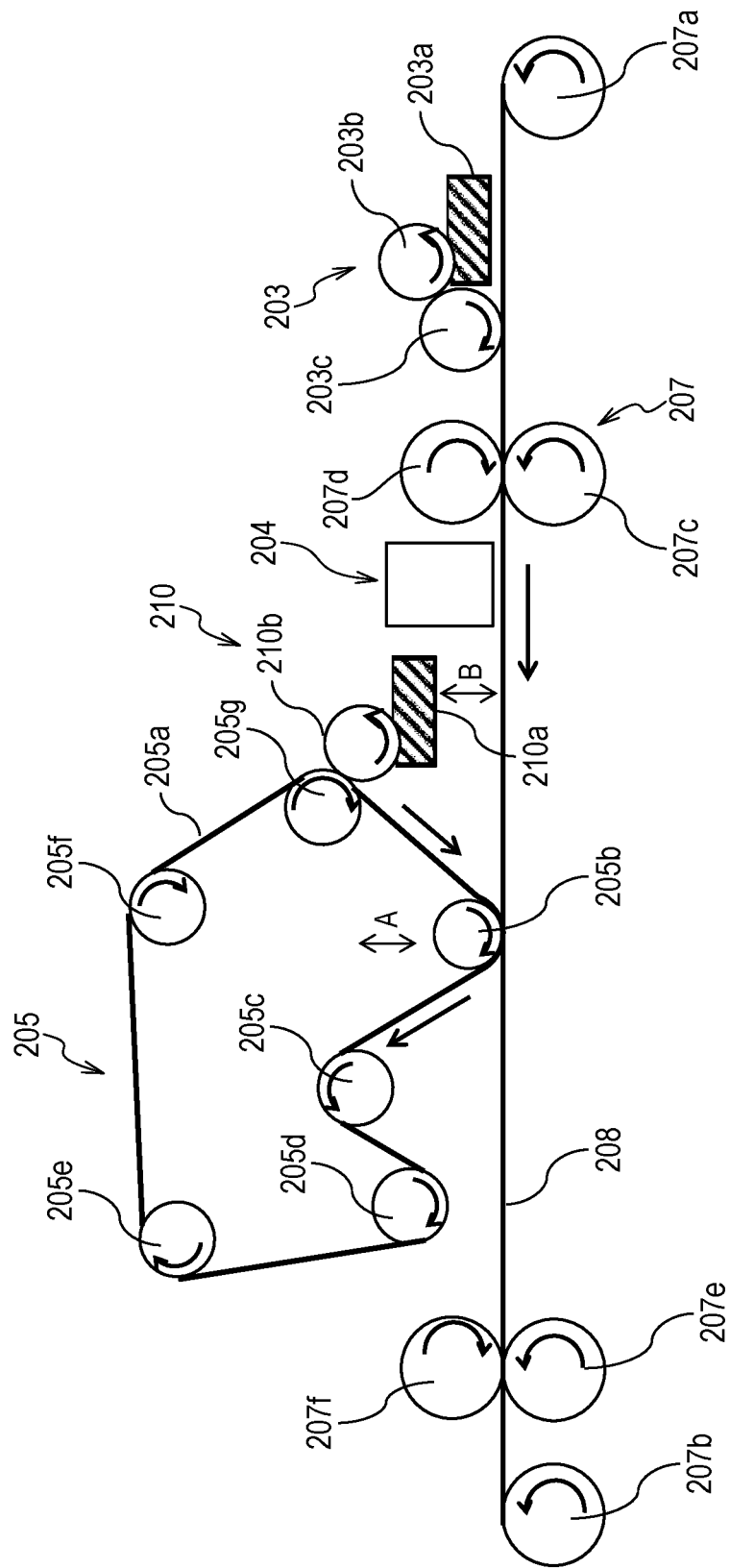
FIG. 4 is a schematic view illustrating an example of a configuration of a direct drawing type ink jet printing apparatus in the present invention.

FIG. 4 is a schematic view illustrating an example of a configuration of a direct drawing type ink jet printing apparatus 200 in the present embodiment. In contrast to the transfer type ink jet printing apparatus described above, the direct drawing type ink jet printing apparatus does not have the transfer body, 101 the support member 102, the cleaning member for transfer body 109, and has the same means as that of the transfer type ink jet printing apparatus except for that an image is formed on a printing medium 208.

Therefore, because of a reaction liquid applying device 203 that applies reaction liquid to the printing medium 208, an ink applying device 204 that applies an ink to the printing medium 208, and a liquid absorbing member 205*a* in contact with the first image on the printing medium 208, a liquid absorbing device 205 that absorbs a liquid component contained in the first image has the same configuration as that of the transfer type ink jet printing apparatus, and a description is omitted.

It is to be noted that in the direct drawing type ink jet printing apparatus of the embodiment, the liquid absorbing device 205 has the liquid absorbing member 205*a*, and a pressing member for liquid absorption 205*b* that presses the liquid absorbing member 205*a* against the first image on the printing medium 208. Also, the shapes of the liquid absorbing member 205*a* and the pressing member for liquid absorption 205*b* are not particularly restricted, and the liquid absorbing member 205*a* and the pressing member for liquid absorption 205*b* having the same shape as the shape of the liquid absorbing member and the pressing member usable by the transfer type ink jet printing apparatus may be used. Also, the liquid absorbing device 205 may have an extending member that extends over the liquid absorbing member. In FIGS. 4, 205*c*, 205*d*, 205*e*, 205*f*, and 205*g* indicate extending rollers as the extending member. The number of extending rollers is not limited to five in FIG. 4, and a necessary number of extending rollers may be disposed according to the design of the device. Also, depending on the ink applying device 204, an ink applying unit that applies an ink to the printing medium 208, and a printing medium support member (not illustrated) that supports a printing medium from below may be provided at a position opposed to a liquid component removing unit causes the liquid absorbing member 205*a* into contact with the first image on the printing medium to remove a liquid component.

Also, the illustrated apparatus has a recovery liquid applying device 210 which applies recovery liquid to the porous body included in the liquid absorbing member 205*a* while the liquid absorbing member 205*a* is repeatedly brought into contact with an image, the recovery liquid having a viscosity lower than the viscosity of the ink and the reaction liquid. As the method of applying recovery liquid, conventionally known various techniques may be used as appropriate. The examples include a method using an inkjet system, die coating, blade coating, a gravure roller, or a method combining an offset roller with these.

FIG. 4 illustrates the recovery liquid applying device 210 in combination of a chamber and an offset roller which serve as recovery liquid applying members 210*a*, 210*b*.

Although not illustrated, as illustrated in the transfer type ink jet printing apparatus 2 of FIG. 2, it is preferable that the previously described wetting liquid applying device be separately provided. Furthermore, as illustrated in the transfer type ink jet printing apparatus 4 of FIG. 3, it is preferable that the wetting liquid applying device also serve as the recovery liquid applying device.

<Printing medium Conveying Device>

In the direct drawing type ink jet printing apparatus in the present embodiment, the printing medium conveying device 207 is not particularly limited, and a publicly known conveying device in the direct drawing type ink jet printing apparatus may be used. As illustrated in FIG. 2, examples include a printing medium conveying device having a printing medium feeding roller 207*a*, a printing medium winding roller 207*b*, and printing medium conveying rollers 207*c*, 207*d*, 207*e*, 207*f*.

<Control System>

The direct drawing type ink jet printing apparatus in the present embodiment has a control system that controls the devices. Similarly to the transfer type ink jet printing apparatus illustrated in FIG. 1, the block diagram illustrating the control system of the entire apparatus in the direct drawing type ink jet printing apparatus illustrated in FIG. 4 is as illustrated in FIG. 5.

Figure 7:
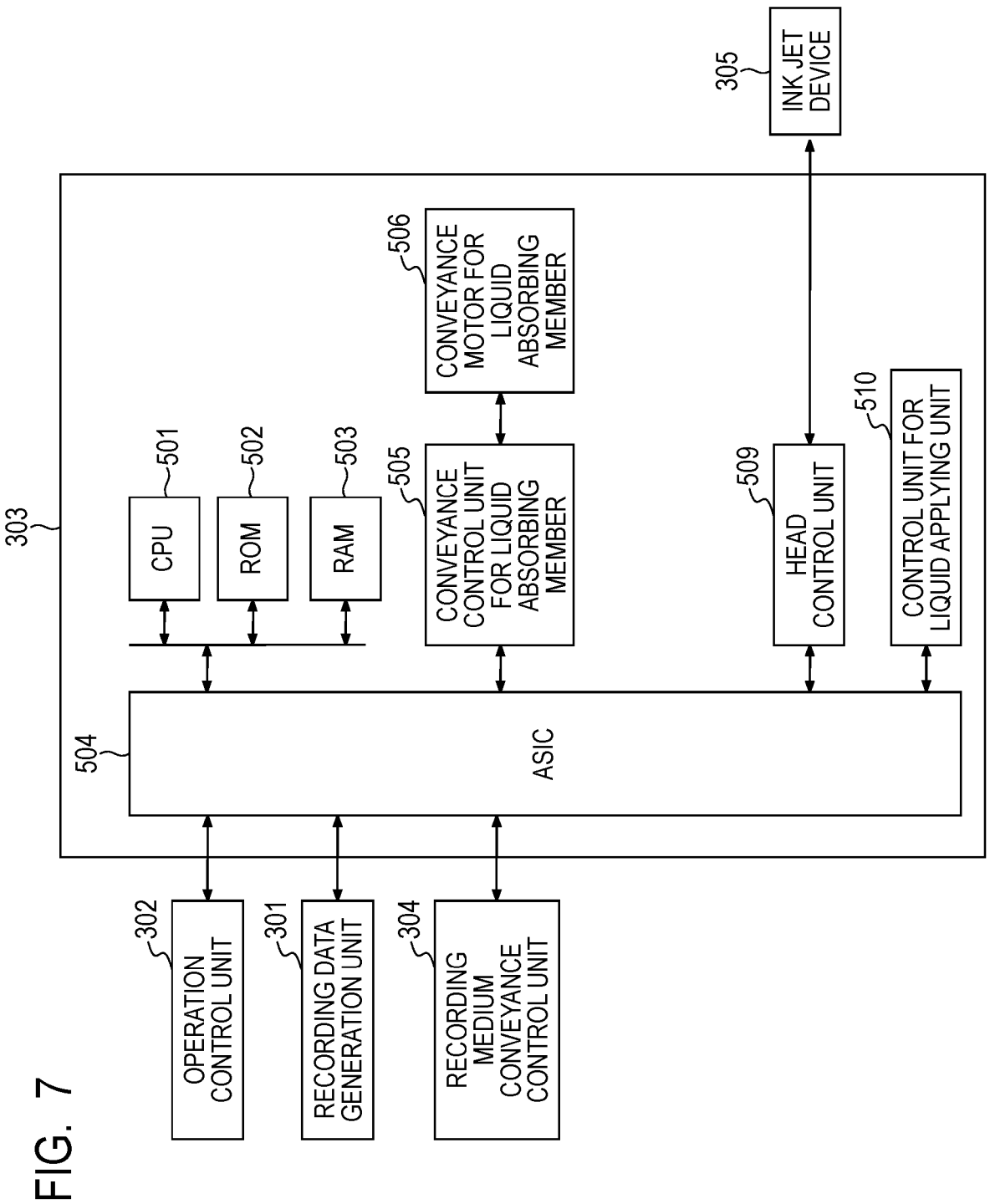
FIG. 7 is a block diagram of a printer control unit in the direct drawing type ink jet printing apparatus illustrated in FIG. 4.

FIG. 7 is a block diagram of a printer control unit in the direct drawing type ink jet printing apparatus illustrated in FIG. 4. The block diagram of FIG. 7 is the same as the block diagram of the printer control unit in the transfer type ink jet printing apparatus in FIG. 6 except for that the transfer body drive control unit 407 and the transfer body drive motor 408 are not provided.

That is, 501 indicates a CPU that controls the entire printer, 502 indicates a ROM for storing a control program of the CPU, and 503 indicates a RAM for executing a program. 504 indicates an ASIC including a network controller, a serial IF controller, a controller for head data generation, and a motor controller. 505 indicates a conveyance control unit for liquid absorbing member for driving a conveyance motor for liquid absorbing member 506, which is command-controlled from ASIC 504 via serial IF. 509 indicates a head control unit that performs final discharge data generation, drive voltage generation of an ink jet device 305 and the like. Also, 510 indicates a control unit controls an application amount in the liquid applying unit. A control unit 510 is command-controlled from ASIC 404 via serial IF. The control unit 510 can control the recovery liquid applying device illustrated in FIG. 4, and the wetting liquid applying device additionally provided as needed in the same manner as the transfer type ink jet printing apparatuses 1 to 3 control. Therefore, the control unit 510 can be utilized as the recovery liquid application control unit or the wetting liquid application control unit.

Also, as the information utilized for control of the timing of application of the recovery liquid to the liquid absorbing member, the following information can be used in addition to the information (A) to (D) previously described:

(E) Information on the type of paper (printing medium) acquired by a paper information acquisition device (printing medium information acquisition device).

The information on the type of paper can be obtained by comparison between data such as surface roughness, basis weight (weight) and pre-stored library data, or information inputted via a user interface.

EXAMPLES

Hereinafter, the present invention will be described in detail using Examples and Comparative Examples. The present invention is not limited by Examples below unless departing from the gist of the invention. It is to be noted that in the description of Examples below, "Part" indicates a mass scale unless otherwise particularly stated.

Example 1

In this Example, the transfer type ink jet printing apparatus 1 illustrated in FIG. 1 is used.

The transfer body 101 in this Example is fixed to the support member 102 by adhesives.

In this Example, PET sheet having a thickness of 0.5 mm is coated with silicone rubber (KE12 manufactured by Shin-Etsu Chemical Co., Ltd.) to obtain a sheet with a rubber thickness of 0.3 mm, and the sheet was used as the elastic layer of the transfer body. Furthermore, glycidoxypropyl trimethoxysilane and methyl triethoxysilane were mixed with a molar ratio 1:1, and a mixture of a condensation product obtained by heat reflux, and an optical cationic polymerization initiator (SP150 manufactured by ADEKA) was produced. The atmospheric pressure plasma treatment was performed so that the angle of contact of water on the surface of the elastic layer was 10 degrees or less. The mixture was applied onto the elastic layer, and film formation was performed by UV irradiation (high pressure mercury ramp, cumulative light exposure of 5000 mJ/cm$^2$), thermal curing (150° C. for 2 hours). The transfer body 101 with a surface layer having a thickness 0.5 µm was produced on the elastic body.

In this configuration, illustration is omitted for simplified description.

A double-sided tape was used between the transfer body 101 and the support member 102 to hold the transfer body 101.

Also, in this configuration, the surface of the transfer body 101 was maintained at 60° C. by a heating device (not illustrated).

The reaction liquid to be applied by the reaction liquid applying device 103 had the following composition, and the application amount was 1 g/m$^2$.
Citrate: 30.0 parts
Potassium hydrate: 3.5 parts
Glycerin: 5.0 parts
Surface-active agent (product name Megafac F444 manufactured by DIC Corporation): 1.0 part
ion-exchange water: the remaining parts
The viscosity of the reaction liquid was 3.5 mPa·s.
The ink was prepared as follows.
<Preparation of Pigment Dispersion>

Carbon black (product name Monarch 1100, manufactured by Cabot Corporation), 10 parts, 15 parts of resin solution (styrene-ethyl acrylate-acrylic acid copolymer, acid value 150, weight average molecular weight (Mw) 8,000, solution having 20.0% by mass of resin content was neutralized by a potassium hydrate solution), and 75 parts of pure water were mixed, prepared in a batch type vertical sand mill (manufactured by IMEX Co., Ltd.), 200 parts of zirconia beads having a diameter of 0.3 mm were charged, and distributed processing performed for 5 hours while being cooled by water. The dispersion liquid was centrifuged to remove coarse particles, then black pigment dispersion having 10.0% by mass of pigment content was obtained.
<Preparation of Resin Particle Dispersion>

20 parts of ethyl methacrylate, 3 parts of 2, 2$^1$-azobis-(2-methylbutyronitrile), 2 parts of n-hexadecane were mixed, and agitated for 0.5 hours. The mixture was dropped into 75 parts of 8% solution of styrene-butyl acrylate-acrylic acid copolymer (acid value: 130 mgKOH/g, weight average molecular weight (Mw): 7,000), and the solution was agitated for 0.5 hours. Next, the solution was irradiated with ultrasonic waves by an ultrasonic irradiation device for 3 hours. Subsequently, polymerization reaction proceeded at 80° C. for 4 hours under a nitrogen atmosphere. After being cooled at a room temperature, the solution was filtered, and a resin particle dispersion having 25.0% by mass of resin content was prepared.

<Preparation of Ink>

The obtained resin particle dispersion and pigment dispersion were mixed with the components below. It is to be noted that the remaining parts of ion exchange water is such an amount that the total of all components constituting the ink is 100.0% by mass.
Pigment dispersion (content of coloring material is 10.0% by mass): 40.0% by mass
Resin particle dispersion: 20.0% by mass
Glycerin: 7.0% by mass
Polyethylene glycol (number average molecular weight (Mn): 1,000): 3.0% by mass
Surface-active agent: Acetyrenol E100 (manufactured by Kawaken Fine Chemicals Co., Ltd): 0.5% by mass
Ion exchange water: the remaining parts
After the mixture was sufficiently agitated, and distributed, pressure filtration was performed by a micro filter (manufactured by Fujifilm Corporation) having a pore size of 3.0 µm, so that black ink was prepared.
The viscosity of the ink was 2.1 mPa·s.

The ink applying device 104 uses a type of inkjet head that discharges an ink on demand system using an electric-heat conversion element. The ink application amount was set to 20 g/m$^2$.

The liquid absorbing member 105a is adjusted to have the same speed as the movement speed of the transfer body 101 by the conveyance rollers 105c, 105d, 105e that convey the liquid absorbing member while extending the member. Also, the printing medium 108 is conveyed by the printing medium feeding roller 107a and the printing medium winding roller 107b to achieve the same speed as the movement speed of the transfer body 101. In this Example, the conveyance speed was set to 0.2 m/s, and Aurora Coated paper (manufactured by Nippon Paper Industries Co., Ltd., basis weight of 104 g/m$^2$ was used as the printing medium 108.

Also, a pressure was applied to the liquid absorbing member 105b so that the average pressure of the nip pressure between the transfer body 101 and the liquid absorbing member 105a achieves 39.23 N/cm$^2$ (4 kg/cm$^2$). Also, in the liquid absorbing device, the pressing member 105b having a roller diameter φ of 200 mm was used.

A member obtained by stacking a support material composed of porous hydrophilic PTFE having an average pore diameter of 0.2 µm and non-woven fabric was used as the liquid absorbing member 105a. The Gurley of the absorbing member I was 8 seconds.

In this Example, recovery liquid is applied to the liquid absorbing member 105a by the recovery liquid applying device 110 comprised of an offset roller. In Example 1, recovery liquid A having the following composition was used as the recovery liquid.

Glycerin: 21.0% by mass
Polyethylene glycol (number average molecular weight (Mn): 1,000): 1.0% by mass
Surface-active agent: Acetyrenol E100 (manufactured by Kawaken Fine Chemicals Co., Ltd): 0.5% by mass
Ion exchange water: the remaining parts Although recovery liquid A had substantially the same water concentration, and substantially the same vapor pressure as the ink, the viscosity of recovery liquid A was lower than that of the ink, and was 1.6 mPas·s. Also, reaction liquid application, ink application, and a liquid absorption treatment step were repeated 1000 times in a cycle of 10 seconds, and the recovery liquid was applied every time in the cycle.

Also, in the ink jet apparatus, the temperature was 40° C., and the humidity was 40%.

Example 2

For Example 1, only the composition of recovery liquid was changed. Recovery liquid B having a higher water concentration than that of the ink and the reaction liquid, and the following composition was used as the recovery liquid.
Ion exchange water: 100 parts
The viscosity of the recovery liquid B was 1 mPas·s.

Example 3

For Example 1, only the composition of recovery liquid was changed. Recovery liquid C having a lower vapor pressure than that of the ink and the reaction liquid, and the following composition was used as the recovery liquid.
Non-aqueous agent: ethylene glycol monoethyl ether: 80.0 parts
Surface-active agent: Acetyrenol E100 (product name): 0.5 parts
Ion exchange water: 19.5 parts The viscosity of the recovery liquid was 1.7 mPas·s.

Example 4

For Example 1, only the application timing of recovery liquid was changed.
The recovery liquid was applied at a rate of once per three times of the cycle of reaction liquid application, ink application, and the liquid absorption treatment step.

Example 5

For Example 1, the cycle between reaction liquid application, ink application, and the liquid absorption treatment step was changed. Although reaction liquid application, ink application, and the liquid absorption treatment step were repeated 1000 times in a cycle of 10 seconds as Example 1, devices for both the recovery liquid application and image formation were stopped for 20 minutes at a rate of once per 100 times.

Also, the recovery liquid was applied every time in the cycle

Example 6

For Example 5, the application sequence of the recovery liquid was changed.
In addition to the normal recovery liquid applying step, a maintenance operation, in which the pressing unit 105a is passed and the recovery liquid is applied with the liquid absorbing member 105a spaced apart from the transfer body, 101 was performed at a rate of once per 10 times of the recovery liquid applying step.

Example 7

The temperature, the humidity in the ink jet apparatus were set to a different condition from Example 1.
In the ink jet apparatus, the temperature was 60° C., and the humidity was 30%.
Also, the recovery liquid was applied at a rate of once per three times of the cycle of reaction liquid application, ink application, and the liquid absorption treatment step.

Example 8

For Example 7, the temperature, and the humidity in the apparatus were detected, and whether or not to apply the recovery liquid was controlled based on information on the detection.
The application of recovery liquid was performed every time in the cycle of reaction liquid application, ink application, and liquid absorption treatment.

Example 9

For Example 1, the direct drawing type ink jet printing apparatus illustrated in FIG. 4 was used, and OK Prince High Quality Paper (product name, manufactured by Oji Paper Co., Ltd., 127.9g/m$^2$) was used.
The recovery liquid was applied at a rate of once per three times of the cycle of reaction liquid application, ink application, and the liquid absorption treatment.

Example 10

For Example 9, the type of the printing medium was detected, and whether or not to apply the recovery liquid was controlled based on information on the detection.
The application of recovery liquid was performed every time in the cycle of reaction liquid application, ink application, and liquid absorption treatment.

Example 11

For Example 1, the transfer type ink jet printing apparatus 2 having a wetting liquid applying device for the liquid absorbing member was used. Also, a member obtained by stacking a support material composed of porous PTFE having an average pore diameter of 0.2 μm and non-woven fabric was used as the liquid absorbing member 105a. The Gurley of the absorbing member was 8 seconds.

Also, wetting liquid having the following composition was coated with 10 g/m$^2$ as the wetting liquid. After the wetting liquid was applied, the liquid absorbing member was used similarly to Example 1, and other conditions were the same as in Example 1. The angle of contact of the wetting liquid with the liquid absorbing member was 85°.
Glycerin: 10.0% by mass
Surface-active agent (product name Megafac F444 manufactured by DIC Corporation): 2.0% by mass
Ion exchange water: the remaining % by mass
The viscosity of the wetting liquid was 1.4 mPas·s.

Example 12

For Example 11, the transfer type ink jet printing apparatus 3 having a wetting liquid and recovery liquid application device was used.

The liquid having the following composition was used as wetting liquid and recovery liquid D. The cycle applied was the same as in Example 1. The wetting liquid and recovery liquid had a higher water concentration and a lower viscosity than those of the ink and the reaction liquid. Also, the angle of contact of the wetting liquid and recovery liquid with the liquid absorbing member was 85°.

Glycerin: 10.0% by mass
Surface-active agent (product name Megafac F444 manufactured by DIC Corporation): 2.0% by mass
Ion exchange water: the remaining % by mass
The viscosity of recovery liquid D was 1.4 mPas·s.

Comparative Example 1

For Example 1, liquid absorption was repeated without application of recovery liquid.

Comparative Example 2

For Example 1, only the composition of recovery liquid was changed.

Recovery liquid E having a higher viscosity than that of the ink and the reaction liquid, and the following composition was used as the recovery liquid.

Glycerin: 50.0% by mass
Polyethylene glycol (number average molecular weight (Mn): 1,000): 1.0% by mass
Surface-active agent: Acetyrenol E100 (manufactured by Kawaken Fine Chemicals Co., Ltd): 0.5% by mass
Ion exchange water: the remaining parts
The viscosity of recovery liquid E was 6.5 mPas·s.

[Evaluation]

The occurrence or non-occurrence of smeared image, and the amount of use of the recovery liquid in Example and Comparative Examples were evaluated.

An evaluation result is illustrated in Tables 1-1 and 1-2.

In the present invention, for the evaluation items mentioned below, evaluation codes AA to B indicate a preferable level, and C indicates an unacceptable level.

<Smeared Image>

The smeared image refers to an amount of movement of the coloring material at an image end after liquid absorption, and a smaller amount of movement indicates a higher image quality, thus is preferable. The evaluation codes are as follows.

AA: when the cycle was repeated 10000 times under the above-described conditions, substantially no smeared image was observed.

A: although smeared image was slightly observed, when the cycle was repeated 10000 times under the above-described conditions, the smeared image was at a negligible level.

B: although smeared image was slightly observed, when the cycle was repeated 5000 times under the above-described conditions, the smeared image was at a negligible level.

C: significant smeared image was observed.

<Used Amount of Recovery Liquid>

The recovery liquid use amount shows a used amount of recovery liquid, and the evaluation codes are as follows.

A: the used amount of recovery liquid was a minimum.

B: the used amount of recovery liquid was such that a problem of cost did not occur.

TABLE 1-1

| | | | Conditions | | | | | Used |
|---|---|---|---|---|---|---|---|---|
| | Apparatus | Printing medium | Temperature Humidity | Device | Recovery liquid application control Application timing | Recovery liquid | Smeared Image | amount of recovery liquid |
| Example 1 | Transfer type ink jet printing apparatus 1 | Transfer body | 40° C. 40% | 1000 cycles continuous | Every time between cycles | A | A | B |
| Example 2 | Transfer type ink jet printing apparatus 1 | Transfer body | 40° C. 40% | 1000 cycles continuous | Every time between cycles | B | AA | B |
| Example 3 | Transfer type ink jet printing apparatus 1 | Transfer body | 40° C. 40% | 1000 cycles continuous | Every time between cycles | C | AA | B |
| Example 4 | Transfer type ink jet printing apparatus 1 | Transfer body | 40° C. 40% | 1000 cycles continuous | Once every three cycles | A | A | A |
| Example 5 | Transfer type ink jet printing apparatus 1 | Transfer body | 40° C. 40% | Intermittent stop of device once per 100 times, and 1000 cycles | Every time between cycles | A | B | B |
| Example 6 | Transfer type ink jet printing apparatus 1 | Transfer body | 40° C. 40% | Intermittent stop of device once per 100 times, and 1000 cycles | Every time between cycles, and empty maintenance provided once every 10 cycles | A | A | B |
| Example 7 | Transfer type ink jet printing apparatus 1 | Transfer body | 60° C. 30% | 1000 Cycles continuous | Once every three cycles | A | B | A |

TABLE 1-2

| | Apparatus | Printing medium | Temperature Humidity | Device | Recovery liquid application control Application timing | Recovery liquid | Smeared Image | Used amount of recovery liquid |
|---|---|---|---|---|---|---|---|---|
| Example 8 | Transfer type ink jet printing apparatus 1 | Transfer body | 60° C. 30% | 1000 cycles continuous | Control by temperature and humidity Every time between cycles | A | A | A |
| Example 9 | Direct drawing type ink jet printing apparatus | OK prince high quality paper | 10° C. 40% | 1000 cycles continuous | Once every three cycles | A | B | A |
| Example 10 | Direct drawing type ink jet printing apparatus | OK prince high quality paper | 40° C. 40% | 1000 cycles continuous | Control by type of printing medium Every time between cycles | A | A | A |
| Example 11 | Transfer type ink jet printing apparatus 2 | Transfer body | 40° C. 40% | 1000 cycles Continuous | Every time between cycles | A | A | B |
| Example 12 | Transfer type ink jet printing apparatus 3 | Transfer body | 40° C. 40% | 1000 cycles Continuous | Every time between cycles | D | AA | B |
| Comparative example 1 | Transfer type ink jet printing apparatus 1 | Transfer body | 40° C. 40% | 1000 cycles Continuous | — | None | C | B |
| Comparative example 2 | Transfer type ink jet printing apparatus 1 | Transfer body | 60° C. 30% | 1000 Cycles continuous | Every time between cycles | E | C | B |

As above, in the present invention, when a porous body having a liquid absorbing member is repeatedly used for liquid absorption treatment of an image which is formed using reaction liquid for ink viscosity increase to promote coloring material fixation, recovery liquid having a viscosity lower than the viscosity of the ink and the reaction liquid is applied to the porous body before being re-used. According to the present invention, increase in the viscosity of the liquid inside the porous body due to repetitive use of the porous body is reduced by application of recovery liquid to the porous body before being re-used, and it is possible to prevent occurrence of smeared image and to form a high definition image.

According to the present invention, it is possible to provide an ink jet printing apparatus and an ink jet printing method that are capable of inhibiting smeared image and forming a high-definition image even when a porous body is repeatedly used for absorbing liquid content from an image formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink jet printing apparatus comprising:
an image forming unit that applies an ink containing an aqueous liquid medium and a coloring material as well as a reaction liquid for increasing ink viscosity to an ink receiving medium, and thereby forms a first image containing an aqueous liquid component and the coloring material; and
a liquid absorbing member including a porous body that absorbs at least part of the aqueous liquid component from the first image,
wherein the ink jet printing apparatus further comprises:
a conveyance unit that performs carrying-in, carrying-out, and re-transmission of the liquid absorbing member to and from a liquid absorption treatment region in which the liquid absorbing member performs liquid absorption treatment on the first image; and
a recovery liquid applying unit that applies a recovery liquid to the liquid absorbing member carried out from the liquid absorption treatment region, the recovery liquid having a viscosity lower than a viscosity of the ink and the reaction liquid.

2. The ink jet printing apparatus according to claim 1, further comprising
a wetting liquid applying unit that applies a wetting liquid having an angle of contact of less than 90° with a first surface of the porous body to the first surface of the porous body before carrying-in or re-transmission to the liquid absorption treatment region.

3. The ink jet printing apparatus according to claim 2, wherein the recovery liquid applying unit also serves as the wetting liquid applying unit.

4. The ink jet printing apparatus according to claim 1, wherein the recovery liquid has a concentration of water higher than a concentration of water of the reaction liquid and the ink.

5. The ink jet printing apparatus according to claim 1, wherein the recovery liquid has a vapor pressure lower than a vapor pressure of the reaction liquid and the ink.

6. The ink jet printing apparatus according to claim 1, further comprising
a control unit that performs conveyance control in which the porous body re-transmitted to the liquid absorption treatment region passes through the liquid absorption treatment region without working and is conveyed to the recovery liquid applying unit.

7. The ink jet printing apparatus according to claim 1, further comprising
a control unit that performs recovery liquid applying control to cause the recovery liquid applying unit to intermittently apply the recovery liquid to the porous body repeatedly used for liquid absorption treatment in the liquid absorption treatment region.

8. The ink jet printing apparatus according to claim 1, wherein the ink receiving medium is a transfer body that temporarily holds the first image and a second image in which at least part of the aqueous liquid component is removed from the first image, and the second image on the transfer body is transferred onto a printing medium for forming a final image.

9. The ink jet printing apparatus according to claim 8, further comprising
a recovery liquid application control unit that controls whether or not to apply the recovery liquid to the porous body by the recovery liquid applying unit.

10. The ink jet printing apparatus according to claim 9, wherein information for controlling whether or not to apply the recovery liquid includes information on a predicted value of a viscosity and/or an amount of liquid in the porous body.

11. The ink jet printing apparatus according to claim 9, wherein information for controlling whether or not to apply the recovery liquid includes information on an environment including a temperature and/or a humidity, the information being acquired by an environmental information acquisition device.

12. The ink jet printing apparatus according to claim 9, wherein information for controlling whether or not to apply the recovery liquid includes information on an elapsed time until the liquid absorption treatment after application of the recovery liquid is completed, the elapsed time being acquired by an elapsed time acquisition device.

13. The ink jet printing apparatus according to claim 1, wherein the ink receiving medium is a printing medium for forming a final image, and
a second image, in which at least part of the aqueous liquid component is removed from the first image by the liquid absorbing member, is formed on the printing medium.

14. The ink jet printing apparatus according to claim 13, further comprising
a recovery liquid application control unit that controls whether or not to apply the recovery liquid to the porous body in the recovery liquid applying unit.

15. The ink jet printing apparatus according to claim 14, wherein information for controlling whether or not to apply the recovery liquid includes information on a predicted value of a viscosity and/or an amount of liquid in the porous body.

16. The ink jet printing apparatus according to claim 14, wherein information for controlling whether or not to apply the recovery liquid includes information on an environment including a temperature and/or a humidity, the information being acquired by an environmental information acquisition device.

17. The ink jet printing apparatus according to claim 14, wherein information for controlling whether or not to apply the recovery liquid includes information on an elapsed time until the liquid absorption treatment after application of the recovery liquid is completed, the elapsed time being acquired by an elapsed time acquisition device.

18. The ink jet printing apparatus according to claim 14, wherein information for controlling whether or not to apply the recovery liquid includes information on a type of printing medium acquired by a printing medium information acquisition device.

19. An ink jet printing apparatus comprising:
an image forming unit that applies an ink containing an aqueous liquid medium and a coloring material as well as a reaction liquid for increasing ink viscosity to an ink receiving medium, and thereby forms an ink image containing an aqueous liquid component and the coloring material; and
a liquid absorbing member including a porous body that concentrates the ink included in the ink image by absorbing at least part of the aqueous liquid component from the ink image,
wherein the ink jet printing apparatus further comprises:
a conveyance unit that performs carrying-in, carrying-out, and re-transmission of the liquid absorbing member to and from a liquid absorption treatment region in which the liquid absorbing member performs liquid absorption treatment on the ink image; and
a recovery liquid applying unit that applies a recovery liquid to the liquid absorbing member carried out from the liquid absorption treatment region, the recovery liquid having a viscosity lower than a viscosity of the ink and the reaction liquid.

20. An ink jet printing method comprising:
an image forming step of applying an ink containing an aqueous liquid medium and a coloring material as well as a reaction liquid for increasing ink viscosity to an ink receiving medium, and thereby forming a first image containing an aqueous liquid component and the coloring material; and
a liquid absorbing step of performing liquid absorption treatment in a liquid absorption treatment region, the liquid absorption treatment including bringing a first surface of a porous body included in a liquid absorbing member into contact with the first image and absorbing at least part of the aqueous liquid component from the first image by the porous body,
wherein the ink jet printing method further comprises:
a conveyance step of re-transmitting the porous body carried out from the liquid absorption treatment region to the liquid absorption region; and
a recovery liquid applying step of causing a recovery liquid applying unit to apply a recovery liquid to the first surface of the porous body before being re-transmitted, the recovery liquid having a viscosity lower than a viscosity of the ink and the reaction liquid.

21. The ink jet printing method according to claim 20, further comprising
a wetting liquid applying step of applying a wetting liquid having an angle of contact of less than 90° with the first surface of the porous body to the first surface of the porous body before being re-transmitted.

22. The ink jet printing method according to claim 21, wherein the recovery liquid applying step is the same step as the wetting liquid applying step.

23. The ink jet printing method according to claim 20, wherein the recovery liquid has a concentration of water higher than a concentration of water of the reaction liquid and the ink.

24. The ink jet printing method according to claim 20, wherein the recovery liquid has a vapor pressure lower than a vapor pressure of the reaction liquid and the ink.

25. The ink jet printing method according to claim 20, further comprising
a passage conveyance step of conveying the porous body re-transmitted to the liquid absorption region to the recovery liquid applying unit while letting the porous body pass through the liquid absorption treatment region without working.

26. The ink jet printing method according to claim 20, wherein the porous body is repeatedly reused for the liquid absorption treatment in the liquid absorbing step, and
the recovery liquid applying step is intermittently performed for the repeated reuse of the porous body.

27. The ink jet printing method according to claim 20,
wherein the ink receiving medium is a transfer body that temporarily holds the first image and a second image in which at least part of the aqueous liquid component is removed from the first image, and
the second image on the transfer body is transferred onto a printing medium for forming a final image.

28. The ink jet printing method according to claim 27, further comprising
a recovery liquid application controlling step of controlling whether or not to apply the recovery liquid to the porous body in the recovery liquid applying unit.

29. The ink jet printing method according to claim 28,
wherein information for controlling whether or not to apply the recovery liquid includes information on a predicted value of a viscosity and/or an amount of liquid in the porous body.

30. The ink jet printing method according to claim 28,
wherein information for controlling whether or not to apply the recovery liquid includes information on an environment including a temperature and/or a humidity, the information being acquired by an environmental information acquisition device.

31. The ink jet printing method according to claim 28,
wherein information for controlling whether or not to apply the recovery liquid includes information on an elapsed time until the liquid absorbing step after the recovery liquid applying step is completed, the elapsed time being acquired by an elapsed time acquisition device.

32. The ink jet printing method according to claim 20,
wherein the ink receiving medium is a printing medium for forming a final image, and
a second image, in which at least part of the aqueous liquid component is removed from the first image, is formed on the printing medium.

33. The ink jet printing method according to claim 32, further comprising
a recovery liquid application controlling step of controlling whether or not to apply the recovery liquid to the porous body in the recovery liquid applying unit.

34. The ink jet printing method according to claim 33,
wherein information for controlling whether or not to apply the recovery liquid includes information on a predicted value of a viscosity and/or an amount of liquid in the porous body.

35. The ink jet printing method according to claim 33,
wherein information for controlling whether or not to apply the recovery liquid includes information on an environment including a temperature and/or a humidity, the information being acquired by an environmental information acquisition device.

36. The ink jet printing method according to claim 33,
wherein information for controlling whether or not to apply the recovery liquid includes information on an environment including a temperature and/or a humidity, the information being acquired by an environmental information acquisition device.

37. The ink jet printing method according to claim 33,
wherein information for controlling whether or not to apply the recovery liquid includes information on a type of printing medium acquired by a printing medium information acquisition device.

38. An ink jet printing method comprising:
a formation step of applying an ink containing an aqueous liquid medium and a coloring material as well as a reaction liquid for increasing ink viscosity to an ink receiving medium, and thereby forming an ink image containing an aqueous liquid component and the coloring material; and
a liquid absorbing step of performing liquid absorption treatment in a liquid absorption treatment region, the liquid absorption treatment including bringing a first surface of a porous body included in a liquid absorbing member into contact with the ink image and concentrating the ink included in the ink image by absorbing at least part of the aqueous liquid component from the ink image by the porous body,
wherein the ink jet printing method further comprises:
a conveyance step of re-transmitting the porous body carried out from the liquid absorption treatment region to the liquid absorption region; and
a recovery liquid applying step of causing a recovery liquid applying unit to apply a recovery liquid to the first surface of the porous body before being re-transmitted, the recovery liquid having a viscosity lower than a viscosity of the ink and the reaction liquid.

* * * * *